US00RE50147E

(19) United States
(12) Reissued Patent
Nam et al.

(10) Patent Number: US RE50,147 E
(45) Date of Reissued Patent: Sep. 24, 2024

(54) UPLINK CONTROL INFORMATION TRANSMISSIONS/RECEPTIONS IN WIRELESS NETWORKS

(71) Applicant: Samsung Electronics Co., Ltd., Suwon-si (KR)

(72) Inventors: Young-Han Nam, Plano, TX (US); Aris Papasakellariou, Houston, TX (US); Boon Loong Ng, Plano, TX (US); Jianzhong Zhang, Plano, TX (US)

(73) Assignee: Samsung Electronics Co., Ltd., Suwon-si (KR)

(21) Appl. No.: 16/566,709

(22) Filed: Sep. 10, 2019

Related U.S. Patent Documents

Reissue of:
(64) Patent No.: 9,876,620
Issued: Jan. 23, 2018
Appl. No.: 14/150,606
Filed: Jan. 8, 2014

U.S. Applications:
(60) Provisional application No. 61/859,690, filed on Jul. 29, 2013, provisional application No. 61/756,921,
(Continued)

(51) Int. Cl.
*H04L 5/00* (2006.01)
*H04L 45/24* (2022.01)
(Continued)

(52) U.S. Cl.
CPC ..... *H04L 5/0053* (2013.01); *H04L 5/001* (2013.01); *H04L 45/24* (2013.01); *H04W 52/346* (2013.01);
(Continued)

(58) Field of Classification Search
CPC ..... H04L 5/0053
See application file for complete search history.

(56) References Cited

U.S. PATENT DOCUMENTS 5,295,153 A 3/1994 Gudmundson
8,031,686 B2 10/2011 Li et al.
(Continued)

FOREIGN PATENT DOCUMENTS

EP 2378819 A2 10/2011
EP 3493606 A1 6/2019
(Continued)

OTHER PUBLICATIONS

Reconsideration Report before Appeal dated Dec. 7, 2020 in connection with Japanese Application No. 2018247278, 7 pages.
(Continued)

*Primary Examiner* — John M Hotaling, II

(57) ABSTRACT

A method and apparatus provide a user equipment (UE) configured to communicate with a plurality of carrier aggregation (CA) groups with at least a first CA group (CG1) and a second CA group (CG2). The UE includes processing circuitry. The processing circuitry is configured to determine whether the UE is power-limited. The UE is scheduled to transmit acknowledged information in a physical uplink shared channel (PUSCH) to a cell of the CG1 and uplink control information (UCI), other than the acknowledgement information, in a physical uplink control channel (PUCCH) to a cell of the CG2. The processing circuitry is also configured to, responsive to the UE being power-limited, prioritize the PUSCH for power allocation. The processing circuitry is also configured to transmit the PUSCH to the cell of the CG1.

29 Claims, 12 Drawing Sheets

Related U.S. Application Data filed on Jan. 25, 2013, provisional application No. 61/751,151, filed on Jan. 10, 2013.

(51) Int. Cl.

| | |
|---|---|
| ***H04W 52/34*** | (2009.01) |
| *H04L 5/14* | (2006.01) |
| *H04W 52/14* | (2009.01) |
| *H04W 52/28* | (2009.01) |
| *H04W 52/32* | (2009.01) |
| *H04W 52/36* | (2009.01) |

(52) U.S. Cl.

CPC ..... *H04L 5/0023* (2013.01); *H04L 5/0035* (2013.01); *H04L 5/0092* (2013.01); *H04L 5/143* (2013.01); *H04W 52/146* (2013.01); *H04W 52/281* (2013.01); *H04W 52/325* (2013.01); *H04W 52/367* (2013.01)

(56) References Cited

U.S. PATENT DOCUMENTS

| | | | | |
|---|---|---|---|---|
| 8,982,801 | B2 | 3/2015 | Shin et al. | |
| 9,634,806 | B2 | 4/2017 | Damnjanovic et al. | |
| 10,051,583 | B2 | 8/2018 | Takaoka et al. | |
| 2008/0032731 | A1 | 2/2008 | Shen et al. | |
| 2009/0082054 | A1 | 3/2009 | Li et al. | |
| 2011/0081936 | A1 | 4/2011 | Haim et al. | |
| 2011/0092219 | A1 | 4/2011 | Damnjanovic et al. | |
| 2011/0141928 | A1 | 6/2011 | Shin et al. | |
| 2011/0141959 | A1 | 6/2011 | Damnjanovic et al. | |
| 2011/0176498 | A1 | 7/2011 | Montojo et al. | |
| 2011/0274043 | A1* | 11/2011 | Nam | H04L 5/001 370/328 |
| 2011/0275403 | A1 | 11/2011 | Chen et al. | |
| 2011/0319120 | A1 | 12/2011 | Chen et al. | |
| 2012/0230258 | A1 | 9/2012 | Miki | |
| 2014/0119246 | A1* | 5/2014 | Yin | H04W 72/12 370/280 |
| 2014/0119304 | A1* | 5/2014 | Li | H04W 52/146 370/329 |
| 2014/0362814 | A1* | 12/2014 | Haim | H04W 52/367 370/329 |
| 2015/0223178 | A1* | 8/2015 | Pietraski | H04L 5/001 370/252 |

FOREIGN PATENT DOCUMENTS

| | | | | |
|---|---|---|---|---|
| JP | 2012-517747 | A | 8/2012 | |
| JP | 2012-216969 | A | 11/2012 | |
| KR | 10-2012-0027526 | A | 3/2012 | |
| KR | 10-2012-0047966 | A | 5/2012 | |
| KR | 20120047966 | A | 5/2012 | |
| KR | 10-2012-0094931 | A | 8/2012 | |
| WO | 2010091425 | A2 | 8/2010 | H04W 52/24 |
| WO | 2011137408 | A2 | 11/2011 | |
| WO | 2012060067 | A1 | 5/2012 | |
| WO | 2012122170 | A1 | 9/2012 | |
| WO | 2013067430 | A1 | 5/2013 | |
| WO | WO 2013/067430 | * | 5/2013 | H04W 52/14 |
| WO | WO 2014/022032 | * | 2/2014 | H04W 24/10 |

OTHER PUBLICATIONS

Grant of Patent dated Nov. 25, 2020 in connection with Korean Application No. 10-2018-7037239, 9 pages.
IP Australia, "Examination report No. 3 for standard patent application," Application No. AU 2018200795, dated Aug. 8, 2019, 7 pages.
Office Action dated Jan. 31, 2020 in connection with India Patent Application No. 1465/KOLNP/2015, 6 pages.
IP Australia, "Notice of acceptance for patent application," Application No. AU2018200795, dated Dec. 16, 2019.
European Patent Office, "Communication pursuant to Article 94(3) EPC," Application No. EP 18215884.0, dated Dec. 11, 2019, 5 pages.
European Patent Office, "European Search Report," Application No. EP 18215884.0, dated May 3, 2019, 9 pages.
Japan Patent Office, "Notice of Reasons for Refusal," Application No. JP 2018-247278, dated Nov. 5, 2019, 11 pages.
Catt, "Further considerations on LTE-A uplink power control," R1-100880, 3GPP TSG RAN WG1 Meeting #60, San Francisco, USA, Feb. 22-26, 2010, 4 pages.
Intel Corporation, "UL Power Control with multiple TA," R1-123166, 3GPP TSG-RAN WG1 #70, Qingdao, China, Aug. 13-17, 2012, 3 pages.
LG Electronics, "Further details on UL power control methods in LTE-Advanced," R1-101349, 3GPP TSG RAN WG1 #60, San Francisco, USA, Feb. 22-26, 2010, 4 pages.
Qualcomm Incorporated, "UL Power Control for Multicarrier Operation," R1-100677, 3GPP TSG RAN WG1 #59bis, Valencia, Spain, Jan. 18-22, 2010, 5 pages.
European Patent Office, "Communication pursuant to Article 94(3) EPC", dated Feb. 19, 2021, in connection with European Patent Application No. 18 215 884.0, 7 pages.
"LTE Release 12 and Beyond", 3GPP RAN WS on Rel-12 and onwards, Jun. 11-12, 2012, RWS-120003, 10 pages.
Office Action dated May 18, 2020 in connection with Japanese Patent Application No. 2015-552584, 11 pages.
Office Action dated Jun. 22, 2020 in connection with Japanese Patent Application No. 2018-247278, 6 pages.
Office Action dated Apr. 28, 2020 in connection with Korean Patent Application No. 10-2015-7014390, 9 pages.
Office Action dated Jun. 10, 2020 in connection with Korean Patent Application No. 10-2018-7037239, 13 pages.
Communication pursuant to Article 94(3) EPC in connection with European Application No. 18215884.0 dated Aug. 18, 2020, 6 pages.
Examination Report in connection with Indian Application No. 201938000224 dated Oct. 30, 2020, 6 pages.
Grant of Patent in connection with Korean Application No. 10-2015-7014390 dated Sep. 28, 2020, 9 pages.
Communication from foreign patent office in a counterpart application, "Examination Report No. 2 for Standard Patent Application," Australian Application No. AU2014205832, dated Jun. 20, 2017, Australian Government IP Australia, 4 pages.
Translation of The Second Office Action dated Oct. 9, 2021, in connection with Chinese Application No. 201811609797.X, 6 pages.
Office action dated Oct. 9, 2021, in connection with Chinese Application No. 201811609797.X, 7 pages.
Communication pursuant to Article 94(3) EPC dated Aug. 17, 2021, in connection with European Application No. 18215884.0, 8 pages.
Trial decision dated Sep. 6, 2021, in connection with Japanese Application No. 2020-14769, 32 pages.
NTT Docomo, "UL Transmissions in Case of Power Limitation for Multiple TA," R1-122376, 3GPP TSG RAN WG1 Meeting #69, Prague, Czech Republic, May 21-25, 2012, 4 pages.
Notice of Reasons for Refusal dated Nov. 29, 2021, in connection with Japanese Application No. 2020-177599, 4 pages.
Indian Patent Office, Hearing Notice in Reference of Application No. 201938000224 issued Oct. 19, 2023, 2 pages.
Partial Supplementary European Search Report dated Aug. 10, 2016 in connection with European Application No. 14737831.9, 10 pages.
Ericsson, et al., "Uplink Power Limitation Handling for Carrier Aggregation", 3GPP TSG RAN WG1 Meeting #60bis, R1-101734, Beijing, China, Apr. 12-16, 2010, 2 pages.
International Search Report dated Mar. 31, 2014 in connection with International Patent Application No. PCT/KR2014/000317, 3 pages.
Written Opinion of International Searching Authority dated Mar. 31, 2014 in connection with International Patent Application No. PCT/KR2014/000317, 5 pages.

* cited by examiner

UPLINK CONTROL INFORMATION TRANSMISSIONS/RECEPTIONS IN WIRELESS NETWORKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S) AND CLAIM OF PRIORITY

The present application *is an application for reissue of U.S. Pat. No. 9,876,620 issued Jan. 23, 2018 on U.S. Non-Provisional patent application Ser. No. 14/150,606 filed Jan. 8, 2014, which* claims priority to U.S. Provisional Patent Application Ser. No. 61/751,151, filed Jan. 10, 2013, entitled "UPLINK CONTROL INFORMATION TRANSMISSIONS/RECEPTIONS IN WIRELESS NETWORKS", U.S. Provisional Patent Application Ser. No. 61/756,921, filed Jan. 25, 2013, entitled "UPLINK CONTROL INFORMATION TRANSMISSIONS/RECEPTIONS IN WIRELESS NETWORKS", and U.S. Provisional Patent Application Ser. No. 61/859,690, filed Jul. 29, 2013, entitled "UPLINK CONTROL INFORMATION TRANSMISSIONS/RECEPTIONS IN WIRELESS NETWORKS". The [content] *contents* of the above-identified patent document [is] *are* incorporated herein by reference.

TECHNICAL FIELD

The present application relates generally to selecting physical uplink channels and, more specifically, to prioritizing power allocation to physical uplink channels.

BACKGROUND

A Physical uplink control channel procedures are discussed in Release 10 of the 3GPP Long Term Evolution (LTE) standard, as described in 3GPP Technical Specification No. 36.213 version 10.1.0 Release 10, "Physical layer procedures." Coordinated multi-point (CoMP) transmission and reception have been considered for LTE-Advanced as a way to improve the coverage of high data rates, to improve cell-edge throughput, and to increase system throughput.

PUCCH transmissions for the two carrier groups (CGs) are independently configured, and hence the user equipment (UE) may be scheduled to transmit two physical uplink control channels (PUCCHs) on the two uplink (UL) primary cells in the two CGs in a subframe.

SUMMARY

In an embodiment, an apparatus provides a user equipment (UE) configured to communicate with a plurality of carrier aggregation (CA) groups with at least a first CA group (CG1) and a second CA group (CG2). The UE includes processing circuitry. The processing circuitry is configured to determine whether the UE is power-limited. The UE is scheduled to transmit acknowledged information in a physical uplink shared channel (PUSCH) to a cell of the CG1 and uplink control information (UCI), other than the acknowledgement information, in a physical uplink control channel (PUCCH) to a cell of the CG2. The processing circuitry is also configured to, responsive to the UE being power-limited, prioritize the PUSCH for power allocation. The processing circuitry is also configured to transmit the PUSCH to the cell of the CG1.

In an embodiment, an apparatus provides a user equipment (UE) configured to communicate with a plurality of carrier aggregation (CA) groups with at least a first CA group (CG1) and a second CA group (CG2). The UE includes processing circuitry. The processing circuitry is configured to determine whether the UE is power-limited. The UE is scheduled to transmit acknowledged information in a physical uplink shared channel (PUSCH) to a cell of the CG1 and uplink control information (UCI), other than the acknowledgement information, in a physical uplink control channel (PUCCH) to a cell of the CG2. The processing circuitry is also configured to, responsive to the UE being power-limited, determine the larger of the first payload and the second payload. The processing circuitry is also configured to prioritize, for power allocation, the first PUSCH or PUCCH or the second PUSCH or PUCCH conveying the larger payload. The processing circuitry is also configured to transmit the prioritized PUSCH or PUCCH.

In an embodiment, an apparatus provides a user equipment (UE) configured to communicate with a plurality of carrier aggregation (CA) groups with at least a first CA group (CG1) and a second CA group (CG2). The UE includes processing circuitry. The processing circuitry is configured to determine whether the UE is power-limited. The UE is scheduled to transmit first uplink control information (UCI) in a first physical uplink shared channel (PUSCH) or physical uplink control channel (PUCCH) to a cell of the CG1 and transmit second UCI in a second PUSCH or PUCCH to a cell of the CG2. The processing circuitry is also configured to, responsive to the UE being power-limited, determine whether the first UCI or the second UCI includes more UCI types, wherein the UCI types include acknowledgement information, channel quality information, and scheduling request information. The processing circuitry is also configured to prioritize, for power allocation, the first PUSCH or PUCCH or the second PUSCH or PUCCH conveying the UCI that includes more UCI types. The processing circuitry is also configured to transmit the prioritized PUSCH or PUCCH.

In an embodiment, a method for prioritizing a physical uplink shared channel (PUSCH) and a physical uplink control channel (PUCCH) in a user equipment (UE) configured to communicate with a plurality of carrier aggregation (CA) groups with at least a first CA group (CG1) and a second CA group (CG2). The process determines whether the UE is power-limited. The UE is scheduled to transmit acknowledged information in the PUSCH to a cell of the CG1 and uplink control information (UCI) to the cell of the CG1, other than the acknowledgement information, in the PUCCH to the CG2. The process, responsive to the UE being power-limited, prioritizes the PUSCH for power allocation. The process transmits the PUSCH to a cell of the CG2.

In an embodiment, a method for prioritizing a physical uplink shared channel (PUSCH) and a physical uplink control channel (PUCCH) in a user equipment (UE) configured to communicate with a plurality of carrier aggregation (CA) groups with at least a first CA group (CG1) and a second CA group (CG2). The process determines whether the UE is power-limited. The UE is scheduled to transmit acknowledgement information having a first payload in a first PUSCH or PUCCH to the CG1 and transmit acknowledgement information having a second payload in a second PUSCH or PUCCH to the CG2. The process, responsive to the UE being power-limited, determines a larger payload of the first payload and the second payload. The process prioritizes, for power allocation, the first PUSCH or PUCCH or the second PUSCH or PUCCH conveying the larger payload. The process transmits the prioritized PUSCH or PUCCH.

In an embodiment, a method for prioritizing a physical uplink shared channel (PUSCH) and a physical uplink control channel (PUCCH) in a user equipment (UE) configured to communicate with a plurality of carrier aggregation (CA) groups with at least a first CA group (CG1) and a second CA group (CG2). The process determines whether the UE is power-limited. The UE is scheduled to transmit first uplink control information (UCI) in a first PUSCH or PUCCH to the CG1 and transmit second UCI in a second PUSCH or PUCCH to the CG2. The process, responsive to the UE being power-limited, determining whether the first UCI or the second UCI includes more UCI types, wherein the UCI types include acknowledgement information, channel quality information, and scheduling request information. The process prioritizes, for power allocation, the first PUSCH or PUCCH or the second PUSCH or PUCCH conveying the UCI that includes more UCI types. The process transmits the prioritized PUSCH or PUCCH.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12B discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged method and apparatus.

For convenience of description, the following abbreviations used in this patent document are defined.

eNB=enhanced node B
UE=user equipment
CA=carrier aggregation
CoMP=coordinated multi-point
UL=uplink
DL=downlink
PDSCH=physical downlink shared channel
PUSCH=physical uplink shared channel
PUCCH=physical uplink control channel
PDCCH=physical downlink control channel
ePDCCH=enhanced PDCCH
RS=reference signal
CSI-RS=channel-state-information reference signal
CRS=cell-specific reference signal
DMRS=demodulation reference signal
HARQ=Hybrid Automatic repeat-reqest
ACK=Acknowledgement signal
DCI=downlink control information
TPC=transmit power control
PCell=primary serving cell
SCell=secondary serving cell
RRC=radio resource control (layer)
TM=transmission mode
SR=scheduling request
QoS=Quality of Service The following documents and standards descriptions are hereby incorporated into the present disclosure as if fully set forth herein:

REF1—3GPP TS 36.211 v10.5.0, "E-UTRA, Physical channels and modulation";

REF2—3GPP TS 36.212 v10.5.0, "E-UTRA, Multiplexing and Channel coding";

REF3—3GPP TS 36.213 v10.5.0, "E-UTRA, Physical Layer Procedures"; and

REF4—Draft 3GPP TR 36.932 v0.1.0, "Scenarios and Requirements for Small Cell Enhancement for E-UTRA and E-UTRAN".

Figure 1:
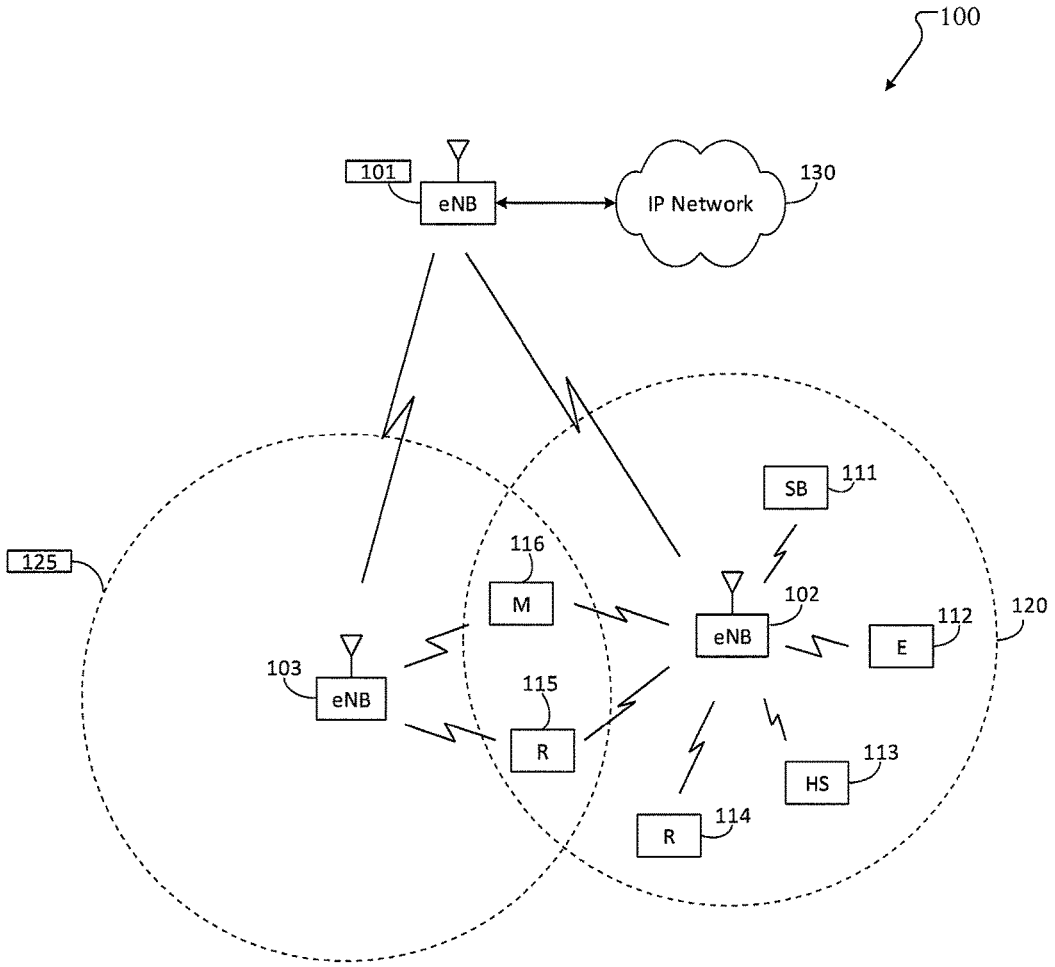
FIG. 1 illustrates an example wireless network according to this disclosure.

FIG. 1 illustrates an example wireless network 100 according to this disclosure. As shown in FIG. 1, the wireless network 100 includes an eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the eNBs 101-103 includes processing circuitry configured to receive the UCI on the prioritized PUxCH. The UE is power-limited, wherein the UE is scheduled to transmit uplink control information (UCI) to the CG1 on one or more physical uplink channels (PUxCHs). The UE prioritized a PUxCH in response to being power limited.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
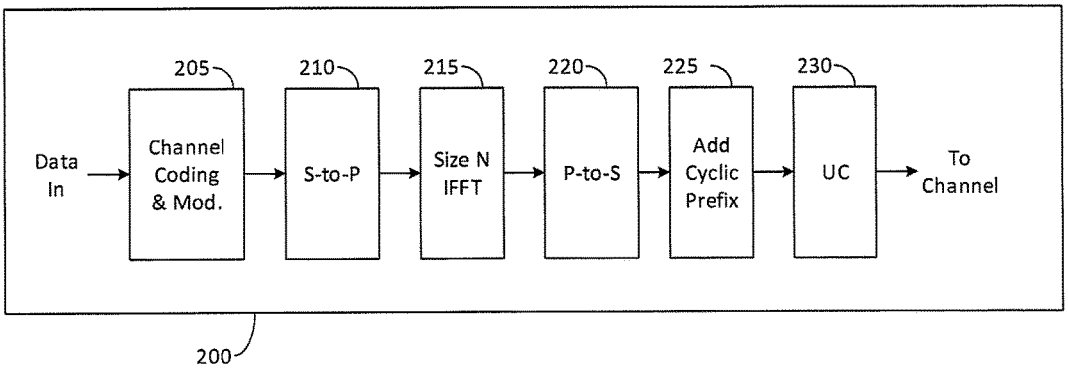
FIGS. 2A and 2B illustrate example high-level diagrams of a wireless transmit path and a wireless receive path according to this disclosure.
Figure 2B:
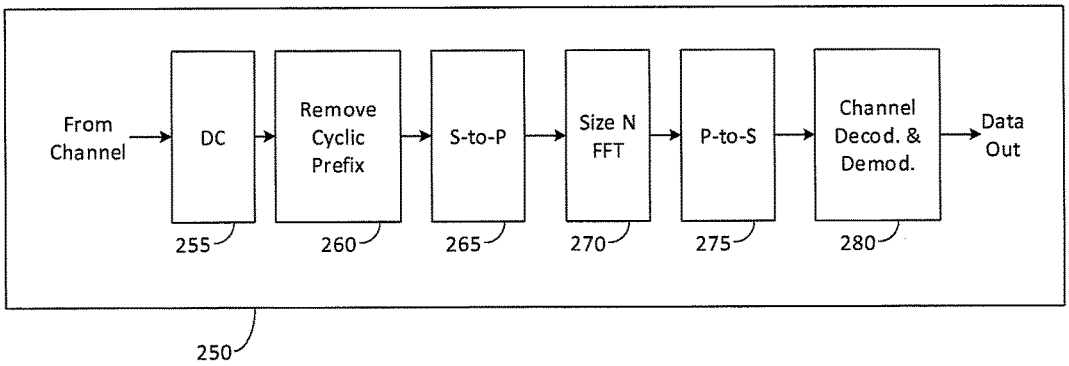

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to receive the UCI on the prioritized PUxCH. The UE is power-limited, wherein the UE is scheduled to transmit uplink control information (UCI) to the CG1 on one or more physical uplink channels (PUxCHs). The UE prioritized a PUxCH in response to being power limited.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
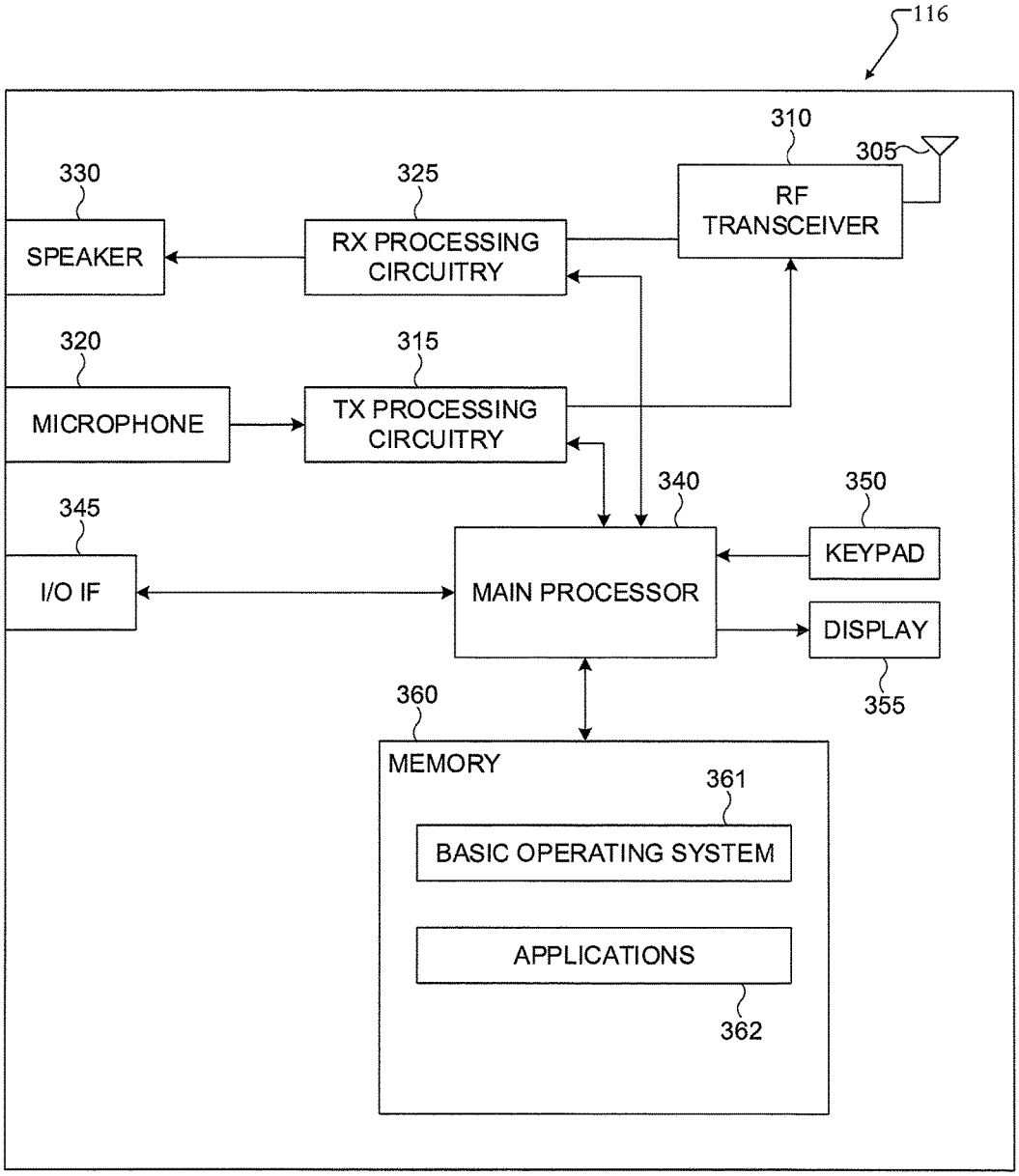
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for selecting a physical uplink channel (PUxCH) as described herein. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
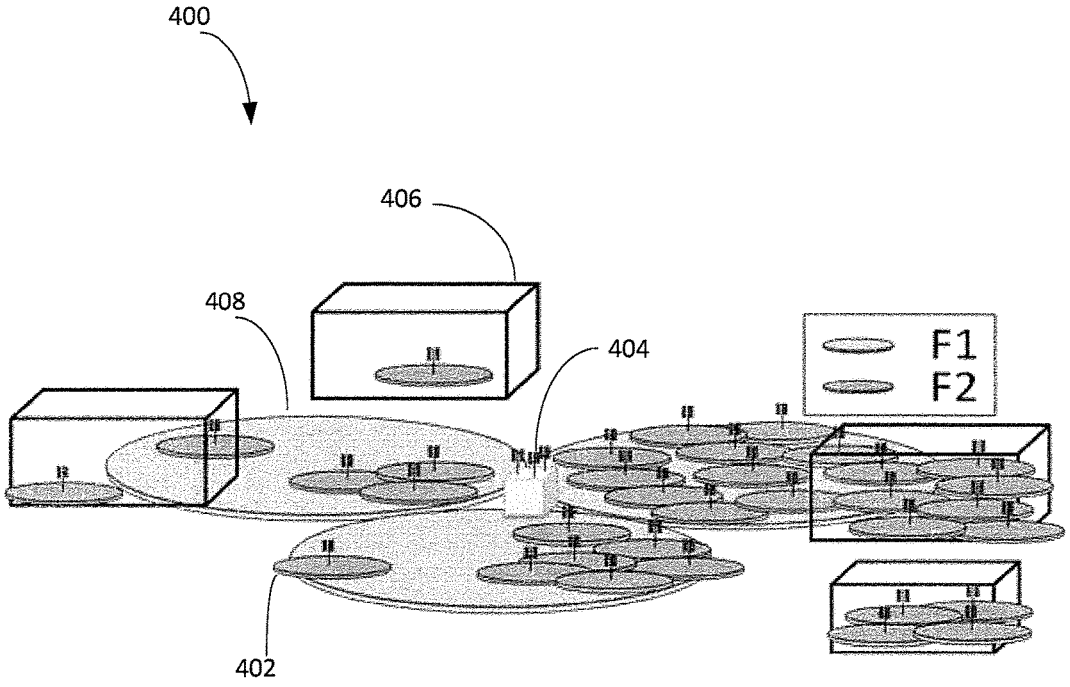
FIG. 4 illustrates an example deployment scenario of small cells and macro cells 404 according to this disclosure.

FIG. 4 illustrates an example deployment scenario 400 of small cells 402 and macro cells 404 according to this disclosure. In some embodiments, regarding small cell enhancement, 3PP TR 36.932 REF4 describes the target scenarios of a small-cell study. Small cell enhancement may target with and without macro coverage, outdoor and indoor small cell deployments, and ideal and non-ideal backhaul. Both sparse and dense small cell deployments may be considered.

In various embodiments with and without macro coverage, as shown in FIG. 4, small cell enhancement can target the deployment scenario in which small cell nodes are deployed under the coverage of one or more overlaid E-UTRAN macro-cell layer(s) in order to boost the capacity of the already-deployed cellular network. In various embodiments, example scenarios can include:

1) where the UE is in coverage of both the macro cell and the small cell simultaneously; and 2) where the UE is not in coverage of both the macro cell and the small cell simultaneously.

FIG. 4 also shows the scenario where small cell nodes, such as the small cell node in an area 406, are not deployed under the coverage of one or more overlaid E-UTRAN macro-cell layer(s) 408. This scenario may also be the target of the small cell enhancement SI.

Figure 5A:
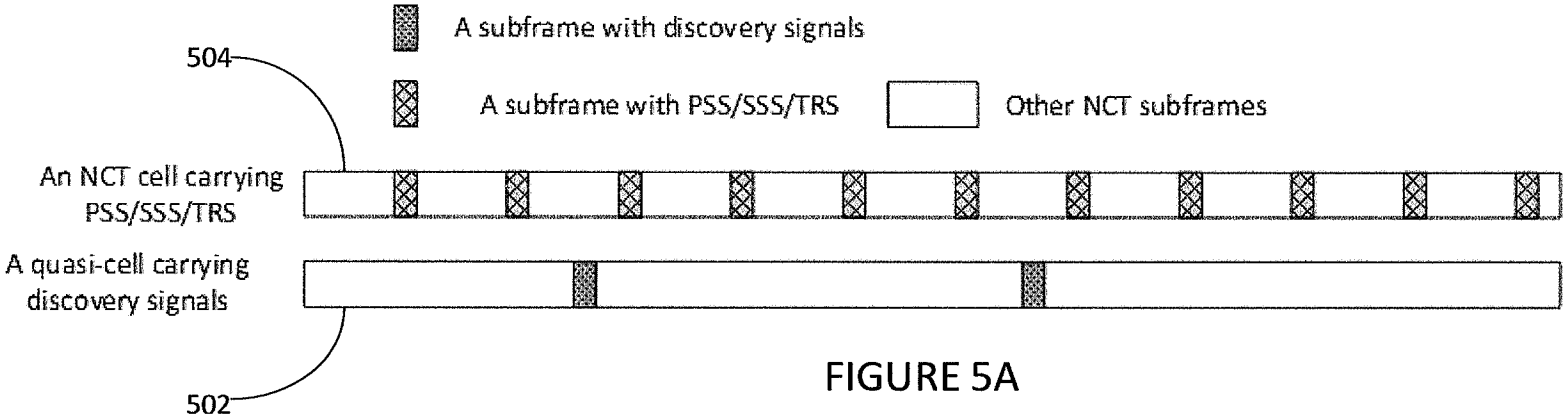
FIGS. 5A and 5B illustrate an example quasi-cell, new carrier type (NCT) cell, and backward compatible cell according to this disclosure. In some embodiments, the quasi-cell is co-channel-deployed on a carrier (or a carrier frequency) together with cells.
Figure 5B:
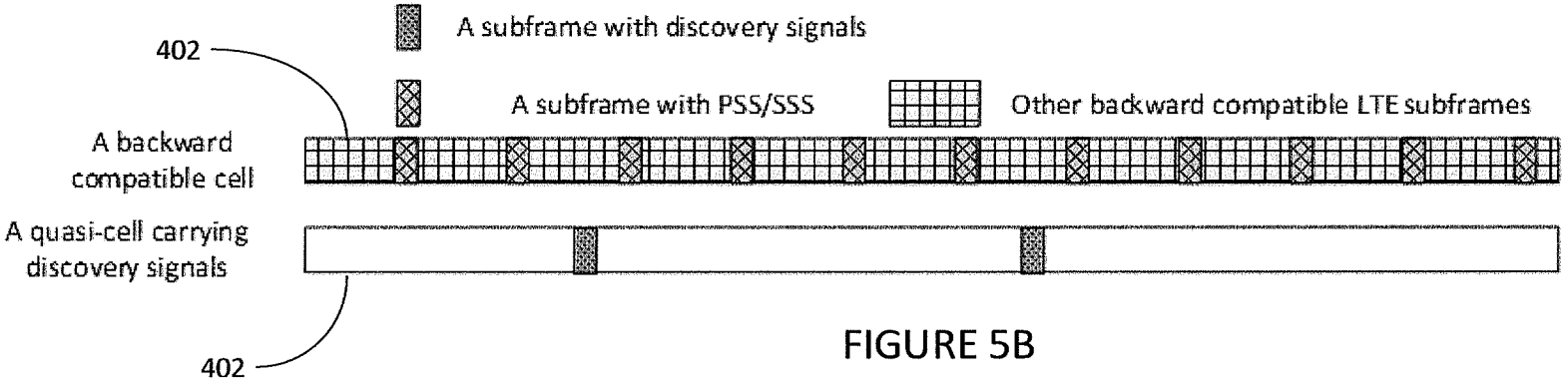

FIGS. 5A and 5B illustrate an example quasi-cell 502, new carrier type (NCT) cell 504, and backward compatible cell 506 according to this disclosure. In some embodiments, the quasi-cell 502 is co-channel-deployed on a carrier (or a carrier frequency) together with cells 504 and 506. The quasi-cell 502 and the cells 504 and 506 may have been placed in two geographically separated locations. Quasi-cell 502 is identified by a quasi-cell specific discovery signal (and discovery identifier or "ID"). An advanced UE can identify quasi-cell 502 by detecting a quasi-cell specific discovery signal, while a legacy UE may not identify quasi-cell 502.

The network can make use of the quasi-cell 502 to transmit physical downlink shared channel (PDSCH) data to both the legacy UE and the advanced UE. When the advanced UE receives PDSCH data from quasi-cell 502, the advanced UE may be aware that it is receiving the PDSCH data from quasi-cell 502. Even when the legacy UE receives PDSCH data from quasi-cell 502, the operation of quasi-cell 502 is transparent to the legacy UE, and the legacy UE does not know the existence of quasi-cell 502 as it operates according to the legacy specification where no specific protocols are defined for the quasi-cells. In some embodiments, quasi-cell 502 may not be a traditional cell, as it does not carry PSS/SSS to be used for identifying the cell and physical cell ID (PCI).

In some embodiments, in 3GPP LTE, there may be a number of downlink (DL) assignment downlink control information (DCI) formats, which convey scheduling information, such as set of scheduled physical resource blocks (PRB)s, transmission rank, set of antenna port numbers, modulation and coding scheme, transmit power control (TPC) command for PUCCH, and the like. Example DL assignment DCI formats can be found in 36.212 REF2, which include DCI format 1A/1C/2/2A/2B/2C/2D. In this disclosure, the phrase "DL assignment DCI format" is used for referring to these DCI formats and variants of them.

In some embodiments, in the legacy RAN2 specification (36.331 v10.5.0), Pcell, Scell and serving cell may be defined in the following manner:

Primary Cell (Pcell): The cell, operating on the primary frequency, in which the UE either performs the initial connection establishment procedure or initiates the connection re-establishment procedure, or the cell indicated as the primary cell in the handover procedure.

Secondary Cell (Scell): A cell, operating on a secondary frequency, which may be configured once an RRC connection is established and which may be used to provide additional radio resources.

Serving Cell: For a UE in RRC_CONNECTED not configured with CA, there is only one serving cell comprising of the primary cell. For a UE in RRC_CONNECTED configured with CA, the term "serving cells" is used to denote the set of one or more cells including the primary cell and all secondary cells.

In some embodiments, in the media access control/radio resource control (MAC/RRC) layer perspective (RAN2), the Pcell (macro) handles mobility and initial access of the UE, while the Scell is used for data transmission/reception. This way, too frequent handover between multiple pico cells can be avoided.

In physical (PHY) layer specifications (RAN1), in some embodiments, the terms Pcell and Scell are adopted to define UE behaviors associated with UL/DL control signaling. Some examples are: PUCCHs are transmitted only in the Pcell; when only the Pcell transmits PDSCH to a UE configured with multiple serving cells, the UE transmits the corresponding HARQ-ACK using PUCCH format 1a/1b; when an Scell transmits PDSCH to the UE, the UE transmits the corresponding HARQ-ACK using PUCCH format 3 (as in Table 1); and common DL control signaling (PDCCH/ePDCCH common search space) is transmitted only in the Pcell.

In various embodiments of this disclosure, the Pcell is defined in Rel-10/11 as the legacy Pcell.

FIGS. 6A through 6D illustrate example inter-eNB CA and CoMP systems 600a-600d according to this disclosure. In FIGS. 6A through 6D, communications occur between a UE 606a-606d and two eNBs, namely eNB 602a-602d and eNB 604a-604d. The eNBs are operating in the same carrier frequency in FIGS. 6C and 6D and in two different carrier frequencies in FIGS. 6A and 6B.

In FIGS. 6A through 6D, one of the two eNBs (cell 1) is a macro eNB, while the other eNB (cell 2) is a pico eNB. However, the concepts in this disclosure can generally apply to two eNBs of any types. The eNBs may be connected with a slow backhaul, where one message transmission from one eNB to the other eNB (or signaling delay between two eNBs) may take more than a few milli-seconds, such as tens of milli-seconds (or subframes).

Figure 6A:
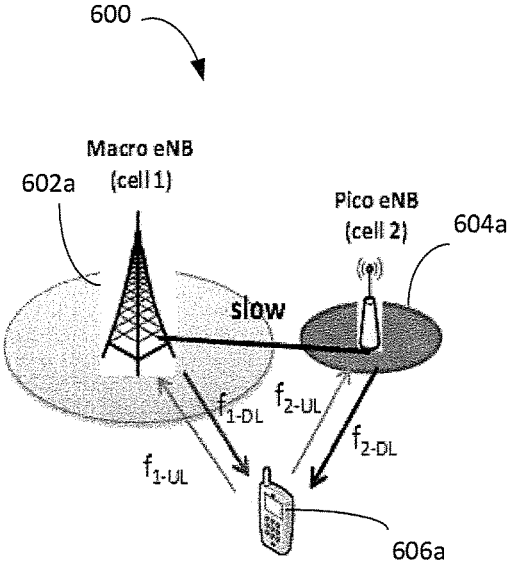
FIGS. 6A through 6D illustrate example inter-eNB CA and CoMP systems according to this disclosure.

FIG. 6A illustrates a frequency division duplex (FDD) inter-eNB CA system 600a. The system 600a includes eNBs 602a and 604a and UE 606a. In system 600a, UE 606a is configured with two serving cells on two different carrier frequencies. The UE 606a transmits and receives signals to/from the macro eNB 602a on carrier frequencies f1-DL and f1-UL, respectively. The UE 606a transmits and receives signals to/from the pico eNB 604a on carrier frequencies f2-DL and f2-UL, respectively.

Figure 6B:
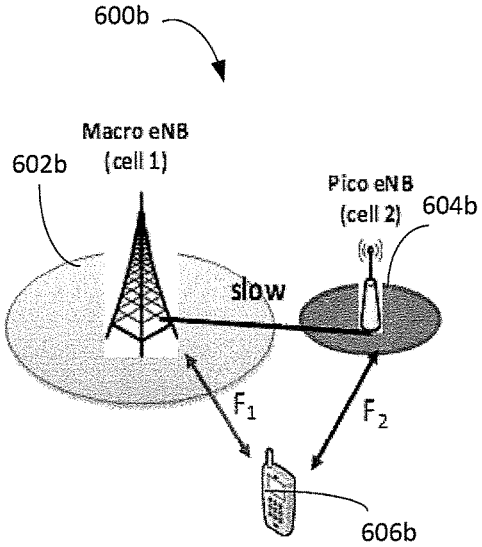

FIG. 6B illustrates a time division duplex (TDD) inter-eNB CA system 600b. The system 600b includes eNBs 602b and 604b and UE 606b. In some embodiments, in system 600b, UE 606b is configured with two serving cells on two different carrier frequencies. The UE 606b transmits and receives signals to/from the macro eNB 602b on carrier frequencies F1, and the UE 606b transmits and receives signals to/from the pico eNB 604b on carrier frequencies F2.

Figure 6C:
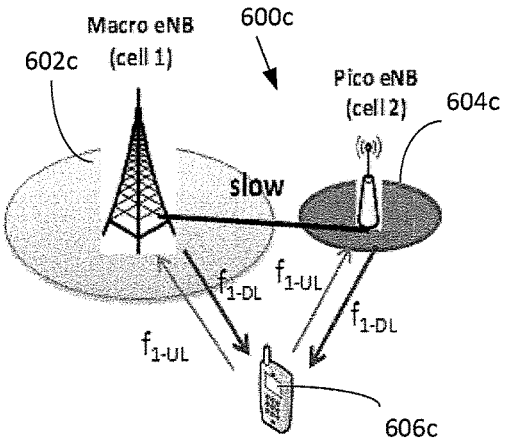

FIG. 6C illustrates an FDD inter-eNB COMP system 600c. The system 600c includes eNBs 602c and 604c and UE 606c. In some embodiments, the UE 606c is configured to support simultaneous reception of 2 PDSCHs from two serving cells (such as the macro and pico cells) on the same carrier frequency, f1-DL for DL and f1-UL for UL.

Figure 6D:
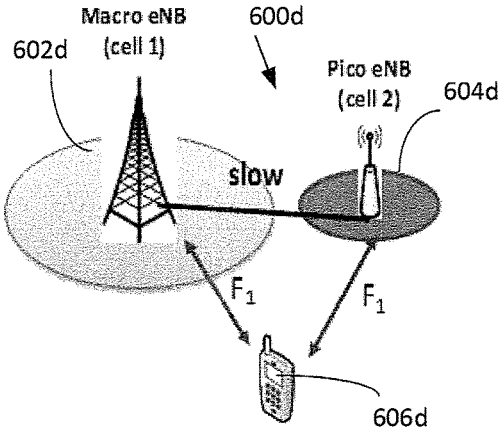

FIG. 6D illustrates a TDD inter-eNB COMP system 600d. The system 600d includes eNBs 602d and 604d and UE 606d. In some embodiments, the UE 606d is configured with a transmission mode (TM) supporting reception of 2 PDSCHs from two serving cells (such as the macro and pico cells) on the same carrier frequency, F1.

For the operations described in FIGS. 6A through 6D, in some embodiments, the UE may be configured with two serving cells (operating in two carrier frequencies in the cases of FIGS. 6A and 6B or in the same carrier frequency in the cases of FIGS. 6C and 6D) according to 3GPP LTE Rel-10 carrier-aggregation specifications. In the Rel-10 carrier aggregation, the assumption is that two cells are either co-located in a single site or, while not co-located, the backhaul delay is negligible (or the signaling delay between the two cells is significantly less than one subframe) so that the two cells in two different sites can operate as if they are in a single site. In such an example, the downlink/uplink scheduling information (such as for PDSCH and PUSCH) of the two cells are dynamically available at each of the two cells.

There are several Rel-10 carrier aggregation operations that rely on the assumption of the dynamically available scheduling information. One such example is PUCCH HARQ-ACK transmissions. In Rel-10, PUCCH can be transmitted only on the primary cell (Pcell) out of the two cells. A PUCCH resource in response to dynamically scheduled PDSCHs is determined by at least one of the dynamically available information, such as a CCE index of a PDCCH scheduling the PDSCH in the Pcell, a state of a TPC field in the PDCCH scheduling the secondary cell's (Scell's) PDSCH, and/or the like.

Figure 7A:
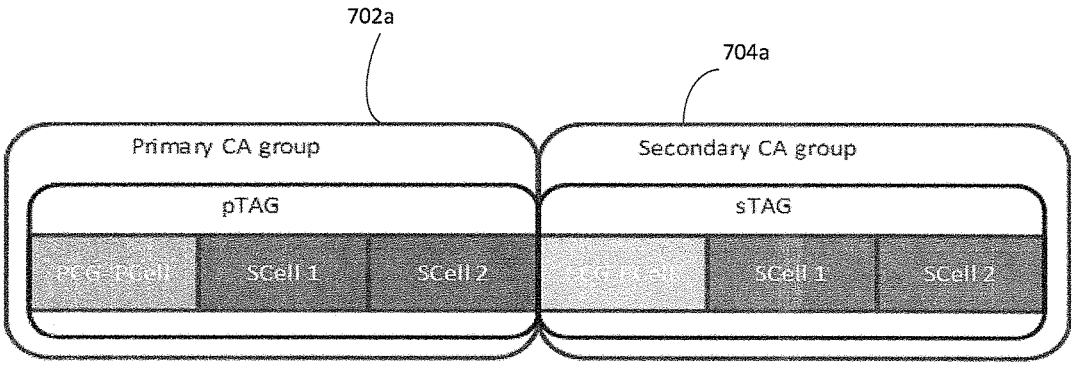
FIGS. 7A-7B illustrate a primary CA group (PCG) and a secondary CA group (SCG) according to an advantageous embodiment of the present disclosure.
Figure 7B:
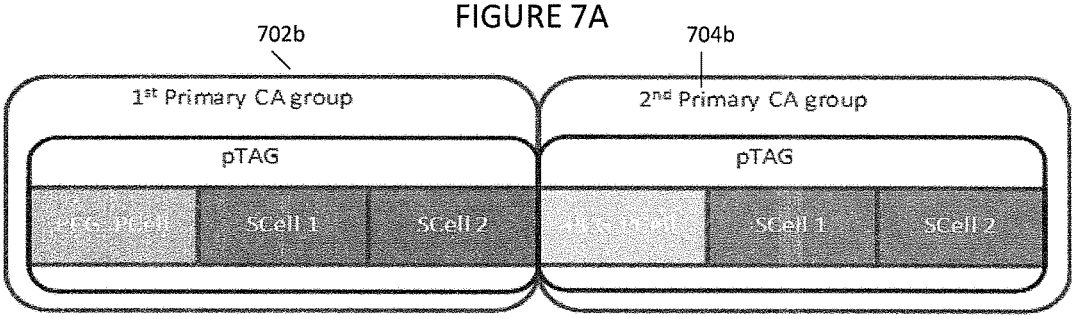

FIGS. 7A-7B illustrate a primary CA group (PCG) 702 and a secondary CA group (SCG) 704 according to an advantageous embodiment of the present disclosure. In an embodiment, the association of cell(s) with the special cell(s) can be realized by grouping cells configured to the UE into one or more CA groups. A CA group can contain one or more than one cells. The cells that are grouped into a CA group are associated with a particular eNodeB (e.g. either serving eNodeB or drift eNodeB). The Uplink Control Information (UCI) (e.g. HARQ-ACK, CSI) for the SCell(s) in one CA group, is transmitted to the cell(s) belonging to the same CA group. In other words, the UCI for cell(s) in one CA group may never be transmitted to the cell(s) in another CA group.

In an embodiment, the CA group comprising of the PCell may be referred to as the Primary CA group (PCG) and the CA group not comprising of the PCell may be referred to as the Secondary CA group (SCG). There may be one PCG but there can be zero, one, or more than one SCG. In an embodiment, the eNodeB handling the PCG may be referred to as the PCG eNodeB, and the eNodeB handling the SCG may be referred to as the SCG eNodeB.

In an embodiment, FIG. 7A illustrates a configuration of primary 702a and secondary 704a CA groups (CG) for inter-eNB CA scenarios. Primary CG 702a and second CG 704a are sometimes called CG1 and CG2, respectively. Assuming coordination over X2 interface, Rel-10/11 basic CA framework can be maintained but enhanced with eNB-centric procedures:

- 'Main' RRC connection to the macro cell (cell 1), 'sub'-RRC connection to the small cell (or pico, or cell 2).
  - (a) Still only one real RRC connection, i.e. RAN node having a signaling connection to the CN.
- Carriers are grouped based on their associations with eNBs: Primary Carrier Group (PCG) and one or more Secondary Carrier Group (SCG).
- No cross carrier scheduling possible between CGs. Cross carrier scheduling within each CG is still possible.
- The UL carriers of respective CG should belong to different Timing Advance Groups (TAG).
- Random access procedures performed fully in respective CG.
- UCIs belonging to different CG are transmitted in the UL carrier(s) of respective CG.

In an embodiment, FIG. 7B illustrates a configuration of 1st 702b and 2$^{nd}$ 704b primary CA groups for inter-eNB CA scenarios. 1st PCG 702b and the 2nd PCG 704b are sometimes called CG1 and CG2, respectively. Assume no coordination over X2 interface (however coordination may be possible over S1), each CG is independently RRC connected (dual RRC connections).

- RRC connection state of each cell at a given time can be different.
  - (a) If both RRC connected, two C-RNTIs
  - (b) Amount of traffic going through each eNB is controlled at S-GW.

In an embodiment, it is also possible to define a CG to be the same as a Timing Advance Group (TAG) with the properties as described above for CG.

Physical channels to carry UCI:

Aperiodic CSI is carried on a PUSCH, regardless of whether HARQ-ACK/SR is fed back in the same subframe or not for the same CG.

HARQ-ACK/SR is carried on PUCCH format 1/1a/1b/3 and PUCCH format 1b with channel selection if not multiplexed with periodic CSI and if no PUSCH is scheduled in the same CG; on PUCCH format 2a/2b/3 if multiplexed with periodic CSI and if no PUSCH is scheduled in the same CG; on PUSCH if at least one PUSCH is scheduled in the same CG.

Periodic CSI is carried in PUCCH format 2 if no PUSCH is scheduled in the same CG; on PUSCH if at least one PUSCH is scheduled in the same CG.

Periodic CSI prioritization/dropping rule

REF3 describes the following on the periodic CSI feedback.

The following CQI/PMI and RI reporting types with distinct periods and offsets are supported for the PUCCH CSI reporting modes given in Table 7.2.2-3:

- Type 1 report supports CQI feedback for the UE selected sub-bands
- Type 1a report supports subband CQI and second PMI feedback
- Type 2, Type 2b, and Type 2c report supports wideband CQI and PMI feedback
- Type 2a report supports wideband PMI feedback
- Type 3 report supports RI feedback
- Type 4 report supports wideband CQI
- Type 5 report supports RI and wideband PMI feedback
- Type 6 report supports RI and PTI feedback Table 1 represents PUCCH Reporting Type Payload size per PUCCH Reporting Mode and Mode State:

| PUCCH | | | PUCCH Reporting Modes | | | |
|---|---|---|---|---|---|---|
| Reporting Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/ second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA | NA |
| | | 4 antenna ports, 4-layer spatial multiplexing | 2 | 2 | 2 | 2 |
| | | 8 antenna ports, 4-layer spatial multiplexing | 2 | NA | NA | NA |
| | | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

In case of collision of a CSI report with PUCCH reporting type 3, 5, or 6 of one serving cell with a CSI report with PUCCH reporting type 1, 1a, 2, 2a, 2b, 2c, or 4 of the same serving cell the latter CSI report with PUCCH reporting type (1, 1a, 2, 2a, 2b, 2c, or 4) has lower priority and is dropped.

For a serving cell and UE configured in transmission mode 10, in case of collision between CSI reports of same serving cell with PUCCH reporting type of the same priority, and the CSI reports corresponding to different CSI processes, the CSI reports corresponding to all CSI processes except the CSI process with the lowest CSIProcessIndex are dropped.

If the UE is configured with more than one serving cell, the UE transmits a CSI report of only one serving cell in any given subframe. For a given subframe, in case of collision of a CSI report with PUCCH reporting type 3, 5, 6, or 2a of one serving cell with a CSI report with PUCCH reporting type 1, 1a, 2, 2b, 2c, or 4 of another serving cell, the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell with CSI report with PUCCH reporting type 1 or 1a of another serving cell, the latter CSI report with PUCCH reporting type 1, or 1a has lower priority and is dropped.

For a given subframe and UE configured in transmission mode 1-9 for all serving cells, in case of collision between CSI reports of different serving cells with PUCCH reporting type of the same priority, the CSI of the serving cell with lowest ServCellIndex is reported, and CSI of all other serving cells are dropped.

For a given subframe and serving cells with UE configured in transmission mode 10, in case of collision between CSI reports of different serving cells with PUCCH reporting type of the same priority and the CSI reports corresponding to CSI processes with same CSIProcessIndex, the CSI reports of all serving cells except the serving cell with lowest ServCellIndex are dropped.

For a given subframe and serving cells with UE configured in transmission mode 10, in case of collision between CSI reports of different serving cells with PUCCH reporting type of the same priority and the CSI reports corresponding to CSI processes with different CSIProcessIndex, the CSI reports of all serving cells except the serving cell with CSI reports corresponding to CSI process with the lowest CSIProcessIndex are dropped.

For a given subframe, in case of collision between CSI report of a given serving cell with UE configured in transmission mode 1-9, and CSI report(s) corresponding to CSI process(es) of a different serving cell with the UE configured in transmission mode 10, and the CSI reports of the serving cells with PUCCH reporting type of the same priority, the CSI report(s) corresponding to CSI process(es) with CSIProcessIndex>1 of the different serving cell are dropped.

For a given subframe, in case of collision between CSI report of a given serving cell with UE configured in transmission mode 1-9, and CSI report corresponding to CSI process with CSIProcessIndex=1 of a different serving cell with the UE configured in transmission mode 10, and the CSI reports of the serving cells with PUCCH reporting type of the same priority, the CSI report of the serving cell with highest ServCellIndex is dropped.

In REF 3, the prioritization of one type of periodic CSI over another is described in a way that the de-prioritized CSI is always dropped. However, in some embodiments of the current disclosure, the de-prioritized CSI is differently handled even if the same prioritization rules are considered.

When the UE in FIG. 6 operates in one of the configurations in FIG. 7, the PUCCH transmissions for the two CGs are independently configured, and hence the UE may be scheduled to transmit two PUCCHs on the two UL Pcells in the two CGs in a subframe. The UE's transmitting two PUCCHs in one subframe can be problematic, because the UE may experience power limitation in the subframe. When the UE is power limited, the UE cannot transmit the two PUCCHs with fully configured power, and the UE may have to reduce the power of at least one of the PUCCHs to meet the UE's power class (e.g., the UE's total transmission power cannot exceed 23 dBm, or Pcmax≤23 dBm). When the power-reduced PUCCH is received together with other full-power PUCCH at an eNB, the power-reduced PUCCH may not be as reliably received as the full-power PUCCH, especially when the power-reduced PUCCH and the full-power PUCCH are transmitted in a same pair of PRBs. This issue is similar to near-far effects happening in CDMA systems.

To resolve the "near-far" effects, it is proposed that at least in case of power limitation, the UE drops one PUCCH out of the two scheduled PUCCHs and transmits only one PUCCH according to a PUCCH prioritization rule.

Figure 8:
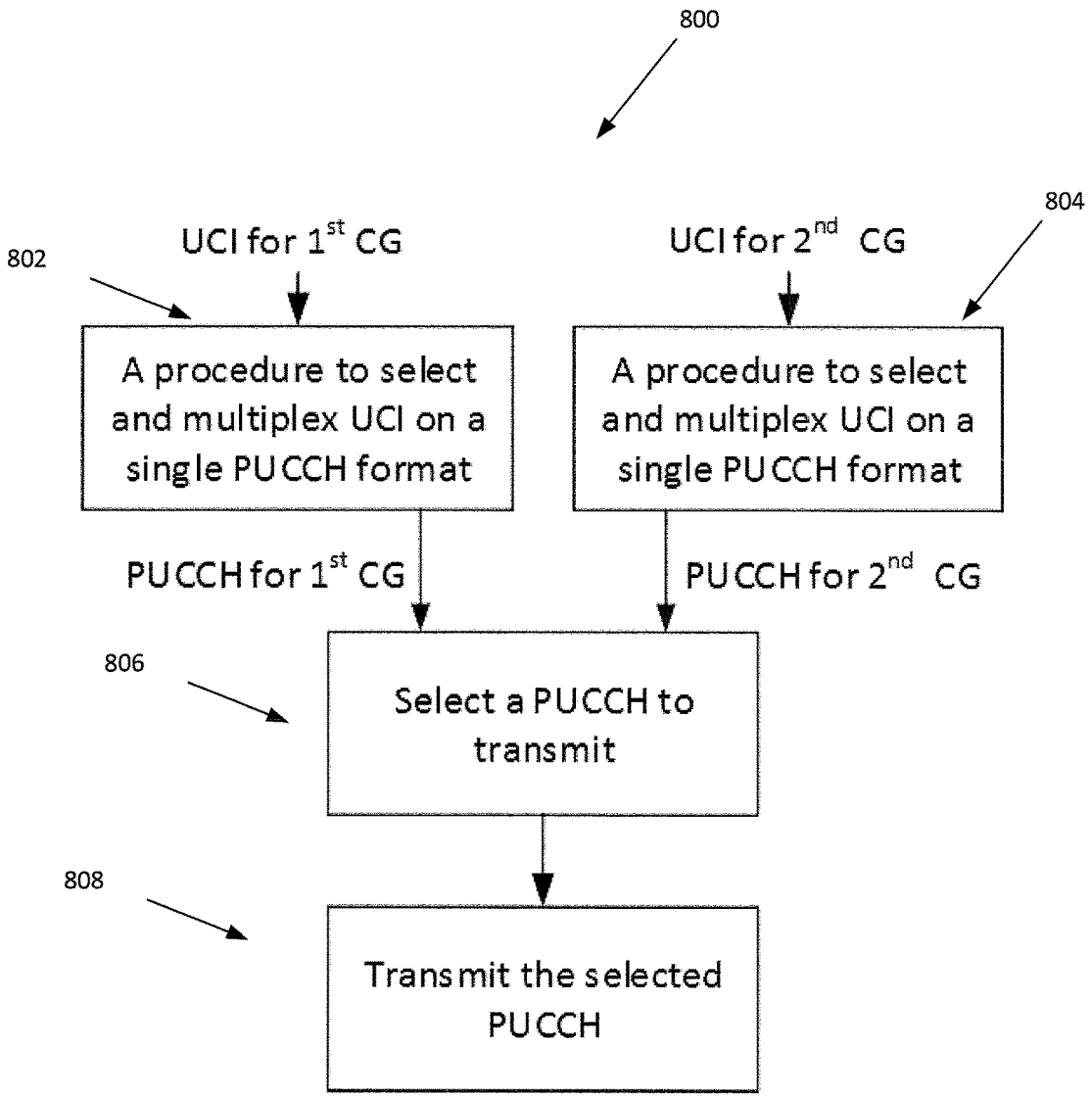
FIG. 8 illustrates an example process for Collision handling when multiple PUCCHs are scheduled in a subframe according to an embodiment of this disclosure.

FIG. 8 illustrates an example process 800 for Collision handling when multiple PUCCHs are scheduled in a subframe according to an embodiment of this disclosure. The processes depicted here could be used by any suitable devices, such as the eNBs and UEs in FIG. 6.

In an embodiment, consider a UE in FIG. 6 operating in one of the configurations in FIG. 7. In operations 802 and 804, the UE is scheduled to transmit a set of UCI (e.g., HARQ-ACK, CSI, SR, or the like) to each of the CGs 1 and 2 in subframe n. Additionally, no PUSCHs have been scheduled for the UE to be transmitted in subframe n. In an embodiment, for each CG, a subset of UCI is selected from the set of UCI intended for the CG, and a PUCCH format to carry the subset of UCI is determined, according to Rel-11 CA procedure.

In operation 806, the UE selects one out of the two PUCCHs to transmit in subframe n. The selected PUCCH is determined according to a prioritization rule and the other PUCCH is dropped.

Figure 9:
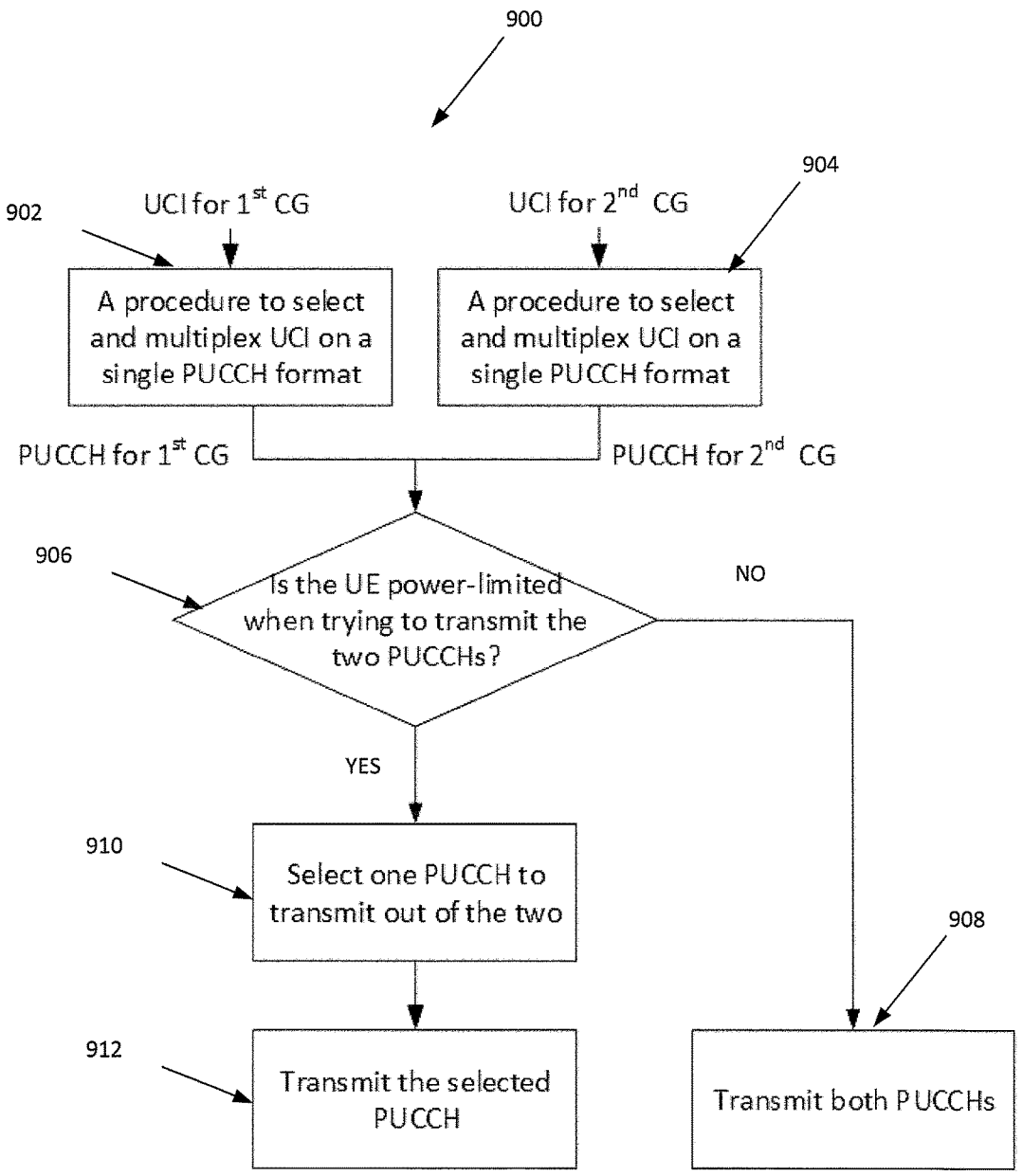
FIG. 9 illustrates an example process for Collision handling when multiple PUCCHs are scheduled in a subframe according to an embodiment of this disclosure.

FIG. 9 illustrates an example process 900 for Collision handling when multiple PUCCHs are scheduled in a subframe according to an embodiment of this disclosure. The processes depicted here could be used by any suitable devices, such as the eNBs and UEs in FIG. 6.

In an embodiment, consider a UE in FIG. 6 operating in one of the configurations in FIG. 7. In operations 902 and 904, the UE is scheduled to transmit a set of UCI (e.g., HARQ-ACK, CSI, SR, or the like) to each of the CGs 1 and 2 in subframe n. Additionally, no PUSCHs have been scheduled for the UE to be transmitted in subframe n. In an embodiment, for each CG, a subset of UCI is selected from the set of UCI intended for the CG, and a PUCCH format to carry the subset of UCI is determined, according to Rel-11 CA procedure.

Furthermore, the UE operation of transmitting PUCCH in the subframe depends upon whether the UE is power-limited in the current subframe or not. The UE is said power-limited if total power, i.e., the sum of the individually calculated two PUCCHs' powers is greater than the UE's power class, or $P_{CMAX}(i)$ dB (or $\hat{P}_{CMAX}(i)$ in linear scale). In operation 906, if the UE is not power limited, then at operation 908, the two PUCCHs are simultaneously transmitted on their respective CGs. In operation 906, if the UE is power limited, then at operation 910, the UE transmits, in operation 912, only one of the two PUCCHs, where in operation 910, the one selected PUCCH is determined according to a prioritization rule. In one or more embodiments, the term "selected" may be a prioritization of one PUCCH over another. For example, power may be allocated to a selected PUCCH with remaining power allocated to any other PUCCHs.

For processes 800 and 900, a prioritization rule for the colliding PUCCHs has to be defined. In this application, we propose the following for that.

In an embodiment, PUCCH format dependent prioritization exists where one PUCCH format is prioritized over another PUCCH format.

PUCCH formats carrying HARQ-ACK can be regarded as more important for the system operation than PUCCH formats carrying CSI. Hence, a PUCCH format carrying HARQ-ACK is prioritized over a PUCCH format carrying CSI.

For example, PUCCH format 1a/1b is prioritized over PUCCH format 2.

Between PUCCH formats carrying HARQ-ACK, PUCCH formats for CA are prioritized over PUCCH formats for non-CA, as the PUCCH formats for CA carry more information than the PUCCH formats for non-CA.

For example, PUCCH format 3 used for carrying HARQ-ACK and PUCCH format 1a/1b with channel selection is prioritized over PUCCH format 1a/1b.

Between a PUCCH format carrying multiple types of information (e.g., HARQ-ACK and CSI) and a PUCCH format carrying a single type of information, the PUCCH format carrying multiple types of information is prioritized, for minimizing the loss.

For example, PUCCH format 2a/2b is prioritized over PUCCH format 1a/1b and PUCCH format 2.

For example, PUCCH format 3 carrying HARQ-ACK and CSI is prioritized over PUCCH format 3 carrying HARQ-ACK only.

Between PUCCH format 1 (only positive SR) and PUCCH format 2 (only periodic CSI), positive SR is prioritized.

In this embodiment, the UE can send positive SR without interruption owing to CSI feedback in another CG.

Considering these three prioritization principles, alternatives for the complete prioritization list are summarized below (where 'A<B' means that A has smaller priority than B):

Alt 1: PUCCH format 2<PUCCH format 1<PUCCH format 1a/1b<PUCCH format 2a/2b<PUCCH format 1a/1b with channel selection<PUCCH format 3 carrying HARQ-ACK only<PUCCH format 3 carrying HARQ-ACK and CSI.

Here, between two PUCCH formats used for HARQ-ACK in CA, PUCCH format 3 is prioritized over PUCCH format 1a/1b with channel selection because PUCCH format 3 can potentially carry more HARQ-ACK information bits than PUCCH format 1a/1b with channel selection.

Alt 2: PUCCH format 2<PUCCH format 1<PUCCH format 1a/1b<PUCCH format 2a/2b<PUCCH format 1a/1b with channel selection=PUCCH format 3 carrying HARQ-ACK only<PUCCH format 3 carrying HARQ-ACK and CSI.

Here, the two PUCCH formats used for HARQ-ACK in CA are equally prioritized.

Alt 3: PUCCH format 2<PUCCH format 1; and a PUCCH format conveying a larger HARQ-ACK payload is prioritized over a PUCCH format conveying a smaller HARQ-ACK payload. The HARQ-ACK payload is determined by a number of configured cells in a CG, a respective PDSCH transmission mode (conveying either one or two transport blocks) and, for a TDD system, a maximum number of DL subframes for which a UE transmits HARQ-ACK in an UL subframe (this maximum number of DL subframes is also referred to as a bundling window).

Tie-breaking rules: The PUCCH format dependent prioritization can be firstly used to determine which PUCCH format to transmit in the subframe. However, it may happen that the two PUCCHs have the same PUCCH format or that two PUCCHs may have the same priority (e.g. as in Alt 2 above). Then tie-breaking rules are necessary for the UE to determine the PUCCH to transmit in the subframe.

Between two identical PUCCH formats for HARQ-ACK/SR, or two PUCCH formats for HARQ-ACK/SR with the same priority: Two alternatives are considered.

Alt 1: PUCCH scheduled in the CG with a lower CG index among the two configured CGs is transmitted. Alternatively, when PCG and SCG are configured, PCG is prioritized over SCG, and only the PUCCH scheduled in the PCG is transmitted. This is beneficial if the SCG is primarily used to carry best-effort traffic and the PCG is primarily used to carry traffic with more stringent QoS requirement.

Alt 2: First compare the number of HARQ-ACK bits in the two PUCCHs; if a first PUCCH carries more HARQ-ACK bits than a second PUCCH, only the first PUCCH is transmitted. Here, the number of HARQ-ACK bits may imply the number of configured HARQ-ACK bits, calculated based upon the configured TMs in the configured serving cells and, for a TDD system, the bundling window size. If the first and the second PUCCHs carry the same number of HARQ-ACK bits, PUCCH in the CG with a lower CG index among the two configured CGs is transmitted; or alternatively, PCG is prioritized over SCG, and only the PUCCH scheduled in the PCG is transmitted.

Between two identical PUCCH formats for CSI, or two PUCCH formats for CSI with the same priority:

Alt 1: PUCCH scheduled in the CG with a lower CG index among the two configured CGs is transmitted. When PCG and SCG are configured, PCG is prioritized over SCG, and only the PUCCH scheduled in the PCG is transmitted. This is beneficial if the SCG is primarily used to carry best-effort traffic and the PCG is primarily used to carry traffic with more stringent QoS requirement.

Alt 2: First compare CSI type carried in the two scheduled PUCCHs; if a first PUCCH carries more prioritized CSI type than a second PUCCH, only the first PUCCH is transmitted (See the background section of Periodic CSI dropping rule). If the first and the second PUCCHs carry the same type of CSI, PUCCH in the CG with a lower CG index among the two configured CGs is transmitted; or alternatively, PCG is prioritized over SCG, and only the PUCCH scheduled in the PCG is transmitted.

In another alternative, we may consider an RRC-configuration based prioritization. In one example, CGs are configured with CG indices. The PUCCH scheduled in a CG with the smallest index is prioritized over the other PUCCHs.

Power allocation when PUCCH and PUSCH with UCI are scheduled in a subframe

Consider a UE in FIG. 6 operating in one of the configurations in FIG. 7. Suppose the UE is scheduled to transmit a set of UCI (HARQ-ACK, CSI, SR, or the like) to each of CGs 1 and 2 in subframe n. Further suppose that at least one PUSCH for a first CG has been scheduled for the UE to be transmitted in subframe n, but the UE is not scheduled to transmit any PUSCHs on a second CG.

Then, for the second CG (without PUSCH), a subset of UCI is selected from the set of UCI intended for the CG, and a PUCCH format to carry the subset of UCI is determined, according to the Rel-11 CA procedure. In addition, for the first CG (with PUSCH(s)), a subset of UCI is selected from the UCI intended for the CG and multiplexed on one selected PUSCH according to the Rel-11 CA procedure.

At times, e.g., at subframe i, the sum of the powers for PUCCH and PUSCH with UCI may exceed the UE's power class $\hat{P}_{CMAX}(i)$ (i.e., the UE is power limited). To resolve the power limitation in this embodiment, two alternative methods, i.e., Method 3 and Method 4 are considered.

Method 3: When power-limited, the power prioritization is that PUCCH>PUSCH with UCI>PUSCH without UCI. In this embodiment, a PUSCH transmission with UCI in serving cell j and the other PUSCH transmission without UCIs in any of the remaining serving cells on the first CG should be power-controlled so that the total transmit power of the UE would not exceed $\hat{P}_{CMAX}(i)$, as in the following:

Firstly, assign full power $P_{PUCCH}(i)$ on the PUCCH.

Secondly, give the smaller of the full power $\hat{P}_{PUSCH,j}(i)$ and the remaining power, to PUSCH with UCI in serving cell j.

Finally, equally scale the remaining power to PUSCHs without UCI in serving cell c's.

In this embodiment, the UE obtains $\hat{P}_{PUSCH,j}(i)$ and $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

and $$\sum_{c \notin j} w(i) \cdot \hat{P}_{PUSCH,c}(i) \le (\hat{P}_{CMAX}(i) - \hat{P}_{PUCCH}(i) - \hat{P}_{PUSCH,j}(i)).$$

where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ defined in REF6 in subframe i and w(i) is a scaling factor of $\hat{P}_{PUSCH,c}(i)$ for serving cell c where $0 \le w(i) \le 1$, In case there is no PUCCH transmission in subframe i$\hat{P}_{PUCCH}(i)$=

Method 4: When power limited, power prioritization is dependent upon the contents of the UCI carried on the PUSCH and the PUCCH.

When PUCCH is prioritized over PUSCH with UCI, the UE obtains $\hat{P}_{PUSCH,j}(i)$ and $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

and $$\sum_{c \neq j} w(i) \cdot \hat{P}_{PUSCH,c}(i) \le (\hat{P}_{CMAX}(i) - \hat{P}_{PUCCH}(i) - \hat{P}_{PUSCH,j}(i)).$$

On the other hand, when PUSCH with UCI is prioritized over PUCCH, two alternatives are considered.

In one alternative (PUCCH Power Allocation Alt 1), the UE obtains $\hat{P}_{PUSCH,j}(i)$ and $\hat{P}_{PUSCH,c}(i)$ according to $$\hat{P}_{PUCCH}(i) = \min(\hat{P}_{PUCCH}(i), (\hat{P}_{CMAX}(i) - \hat{P}_{PUSCH,j}(i)))$$

and $$\sum_{c \neq j} w(i) \cdot \hat{P}_{PUSCH,c}(i) \le (\hat{P}_{CMAX}(i) - \hat{P}_{PUCCH}(i) - \hat{P}_{PUSCH,j}(i)).$$

This alternative ensures that the less-prioritized PUCCH is still transmitted, even if the transmission power is reduced.

In another alternative (PUCCH Power Allocation Alt 2), the PUCCH is transmitted only when the UL transmission is not power limited; the PUCCH is dropped when the UL transmission is power limited. In other words, the UE obtains $\hat{P}_{PUSCH,j}(i)$ and $\hat{P}_{PUSCH,c}(i)$ according to $$\hat{P}_{PUCCH}(i) = \begin{cases} \hat{P}_{PUCCH}(i), & \text{if } \hat{P}_{PUSCH,j}(i) + \hat{P}_{PUCCH}(i) \le \hat{P}_{CMAX}(i) \\ 0 & \text{otherwise} \end{cases},$$

and $$\sum_{c \neq j} w(i) \cdot \hat{P}_{PUSCH,c}(i) \le (\hat{P}_{CMAX}(i) - \hat{P}_{PUCCH}(i) - \hat{P}_{PUSCH,j}(i)).$$

According to this alternative, the PUCCH is transmitted with its full power whenever the PUCCH is transmitted, and the PUCCH is dropped (or is assigned with zero power) when the remaining power after allocating full power to $\hat{P}_{PUSCH,j}(i)$ is not sufficient to transmit the PUCCH with the full power. This method eliminates the near-far effect.

In one alternative, a PUSCH with UCI is prioritized over a PUCCH in at least one of the following cases:

The PUSCH carries aperiodic CSI.

The PUSCH is transmitted in the CG with lower index than the CG in which the PUCCH is scheduled.

The eNB can configure CG indices for the configured CGs.

The PUSCH carries UCI with higher priority than the UCI carried by the PUCCH

For example, the PUSCH carries HARQ-ACK and the PUCCH does not carry HARQ-ACK.

For example, the PUSCH carries HARQ-ACK with higher payload than the HARQ-ACK carried by the PUCCH Otherwise, the PUCCH is prioritized over the PUSCH with UCI.

Aperiodic CSI is most prioritized so that an eNB can expect to receive aperiodic CSI whenever the eNB has triggered the aperiodic CSI in a respective CG. Between HARQ-ACK/SR and periodic CSI, HARQ-ACK/SR is prioritized to ensure reliable HARQ operation.

Power allocation when at least two PUSCHs with UCI are scheduled in a subframe

Consider a UE in FIG. 6 operating in one of the configurations in FIG. 7. Suppose the UE is scheduled to transmit a set of UCI (HARQ-ACK, CSI, SR, or the like) to each of CGs 1 and 2 in subframe n. Further suppose that at least one PUSCH for each of a first CG and a second CG has been scheduled for the UE to be transmitted in subframe n.

For each of the first and the second CGs (with PUSCH(s)), a subset of UCI is selected from the UCI intended for the CG and multiplexed on one selected PUSCH according to the Rel-11 CA procedure.

At times, e.g., at subframe i, the sum of the powers for PUCCH and PUSCH with UCI may exceed the UE's power class $\hat{P}_{CMAX}(i)$ i.e., the UE is power limited. In this embodiment, PUSCH transmissions with UCI in serving cell j1 and serving cell j2 the other PUSCH transmission without UCIs in any of the remaining serving cells should be power-controlled so that the total transmit power of the UE would not exceed $\hat{P}_{CMAX}(i)$ The set of serving cell indices for carrying PUSCHs with UCI are denoted by J, which is J={j1, j2} in this embodiment.

Two alternative methods for resolving the power limitation issue, i.e., Method 5 and Method 6 are considered as in the following.

Method 5: When power limited, the two PUSCHs with UCI are equally prioritized over the PUSCHs without UCI in the power control, as in the following:

If the sum of the two PUSCH transmission powers in serving cell j1 and j2 exceeds total power (i.e., $\hat{P}_{PUSCH,j_1}(i)+\hat{P}_{PUSCH,j_2}(i)>\hat{P}_{CMAX}(i)$), then, apply the same scaling factor w(i) for the PUSCHs with UCI so that the total power does not exceed $\hat{P}_{CMAX}(i)$ (i.e., $$\left(\text{i.e., } \sum_{j \in J} w(i) \cdot \hat{P}_{PUSCH,j}(i) \le \hat{P}_{CMAX}(i)\right),$$

and assign 0 power to the other PUSCHs.

Otherwise, firstly assign full power to PUSCH transmissions with UCI in serving cell j1 and j2; then equally split the remaining power to PUSCHs without UCI in serving cell c's $$\left(\text{i.e., } \sum_{c \notin J} w(i) \cdot \hat{P}_{PUSCH,c}(i) \le \left(\hat{P}_{CMAX}(i) - \sum_{j \in J} \hat{P}_{PUSCH,j}(i)\right)\right).$$

Method 6: When power limited, power allocation to a PUSCH carrying UCI with higher priority is more prioritized, than the UCI carried by the other PUSCH.

When PUSCH in serving cell j1 is prioritized over PUSCH in serving cell j2 in the power allocation, the power control is performed according to the following:

If the sum of the two PUSCH transmission powers in serving cell j1 and j2 exceeds total power (i.e., $\hat{P}_{PUSCH,j_1}(i)+\hat{P}_{PUSCH,j_2}(i)>\hat{P}_{CMAX}(i)$), then, assign full power to the PUSCH in serving cell j1, and assign the remaining power to the PUSCHs in serving cell j2 (i.e., $\hat{P}_{PUSCH,j_2}(i)=\min(\hat{P}_{PUSCH,j_2}(i), (\hat{P}_{PUSCH,j_2}(i), (\hat{P}_{CMAX}(i)-\hat{P}_{PUSCH,j_1}(i))))$), and assign 0 power to the other PUSCHs.

Otherwise, first assign full power to PUSCH transmissions with UCI in serving cell j1 and j2; then apply the same scaling factor w(i) for the PUSCHs without UCI in serving cell c's so that the total power does not exceed $\hat{P}_{CMAX}(i)$ (i.e., $$\sum_{c\notin J} w(i)\cdot\hat{P}_{PUSCH,c}(i) \le \left(\hat{P}_{CMAX}(i) - \sum_{j\in J}\hat{P}_{PUSCH,j}(i)\right)\Bigg).$$

In one alternative UCI prioritization, aperiodic CSI (with/without HARQ-ACK/SR)>HARQ-ACK/SR (with or without periodic CSI)>Periodic CSI (without HARQ-ACK).

When all the PUSCHs with UCI carry the same priority UCI, alternative methods for the power limitation case are:

Alt 1: The same scaling factor is applied to the PUSCHs with UCI so that the total transmission power does not exceed $$\hat{P}_{CMAX}(i)\left(\text{i.e., } \sum_{j\in J} w(i)\cdot\hat{P}_{PUSCH,j}(i) \le \hat{P}_{CMAX}(i)\right)$$

Alt 2: The PUSCH transmitted in the PCG is prioritized and the PUSCH transmitted in the SCG is allocated the remaining power or its transmission is suspended by the UE.

Alt 3: The UE decides which of the PUSCHs to prioritize depending upon the contents of the UCI.

When the same priority UCI is HARQ-ACK/SR, one PUSCH carrying more number of HARQ-ACK bits is prioritized over another PUSCH in the power allocation. When the numbers of HARQ-ACK bits are identical for all the PUSCHs with UCI, one of Alt 1 or Alt 2 is used for the power allocation.

When the same priority UCI is periodic CSI, one PUSCH carrying more prioritized periodic CSI according to Rel-11 periodic CSI prioritization/dropping rule is prioritized over another PUSCH in the power allocation. When the types of periodic CSI are identical, one of Alt 1 or Alt 2 is used for the power allocation.

Embodiment: CG-Priortization-Index Based Prioritization

For simplicity, we propose CG-prioritization-index based prioritization for UCI transmission. Here, it is noted that the eNB can configure CG-prioritization-index for the configured CGs in the higher layer (e.g., RRC). We denote the RRC information element (IE) configuring a CG by CG-Config.

In one alternative, the CG-prioritization-index is the same as the CG index (CG-Identity), and it is not explicitly signaled. In this embodiment, the CG-Config may look like:

```
CG-Config {
...
CG-Identity Integer
...
}
```

In one example, CG-Identity for the PCG has the smallest value among the configured CG-Identity values. In another example CG-Identity for the PCG is equal to 0 and CG-Identity for SCGs is greater than 0. In one alternative, the CG-prioritization-index (CG-Prioritization-Identity) is configured as a field in the IE configuring a CG. In this embodiment, the CG-Config may look like:

```
CG-Config {
...
CG-Identity Integer
CG-Prioritization-Identity Integer
...
}
```

In one alternative, two CG-prioritization-indices are configured per CG, one for HARQ-ACK (CG-Prioritization-HARQ-ACK-Identity) and the other for periodic CSI (CG-Prioritization-PCSI-Identity). In this embodiment, the CG-Config may look like:

```
CG-Config {
...
CG-Identity Integer
CG-Prioritization-HARQ-ACK-Identity Integer
CG-Prioritization-PCSI-Identity Integer
...
}
```

When two PUCCHs are scheduled in a subframe for the UE:

In one alternative, the PUCCH scheduled in a CG with the lowest CG-prioritization-index is transmitted, while the other PUCCHs are dropped.

In another alternative, when power is not limited, both PUCCHs are transmitted; when power is limited, the PUCCH scheduled in a CG with the lowest CG-prioritization-index is transmitted, while the other PUCCHs are dropped.

When power limited, when PUCCHs and PUSCHs with UCI are scheduled for the UE in a subframe, between the PUxCHs for UCI transmission, the PUxCH scheduled in a CG with a lower CG-prioritization-index is prioritized in power allocation. In case PUSCHs without UCI are also scheduled in the same subframe, the remaining power after allocating the power to the PUxCH(s) are allocated to the PUSCHs without UCI, applying equal power scaling.

When power limited, when two PUSCHs with UCI are scheduled for the UE in a subframe, the two PUSCHs with UCI are prioritized over PUSCHs without UCI in the power allocation. Between the PUSCHs with UCI, the PUSCH with UCI carried in the CG with smaller CG-prioritization-index is prioritized over the other PUSCH.

If the sum of the two PUSCH transmission powers in serving cell j1 and j2, exceeds total power (i.e., $\hat{P}_{PUSCH,j_1}(i)+\hat{P}_{PUSCH,j_2}(i)>\hat{P}_{CMAX}(i)$), then, assign full power to the PUSCH in serving cell j=min(j1, j2) and assign the remaining power to the PUSCHs in the other serving cell (for example, if j=j 1, then the other serving cell is j2, and $\hat{P}_{PUSCH,j_2}(i)=\min(\hat{P}_{PUSCH,j_2}(i), \quad (\hat{P}_{CMAX}(i)-\hat{P}_{PUSCH,j_1}(i))))$, and assign 0 power to the other PUSCHs.

Otherwise, firstly assign full power to PUSCH transmissions with UCI in serving cell j1 and j2; then equally split the remaining power to PUSCHs without UCI in serving cell c's $$\left(\text{i.e., } \sum_{c\notin J} w(i)\cdot \hat{P}_{PUSCH,c}(i) \le \left(\hat{P}_{CMAX}(i) - \sum_{j\in J}\hat{P}_{PUSCH,j}(i)\right)\right).$$

Figure 10:
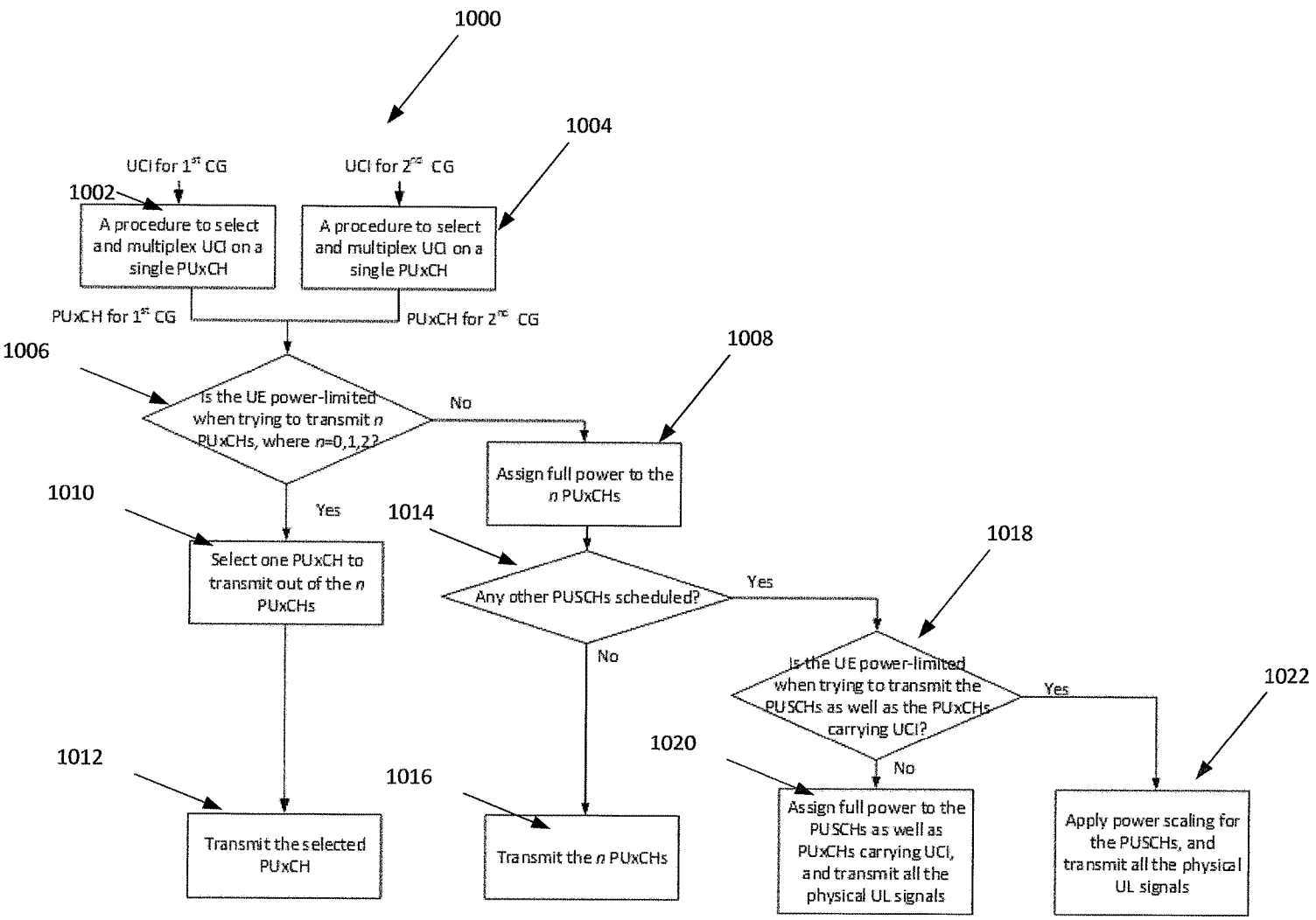
FIG. 10 illustrates an example process for overall CG prioritization rule for UCI transmissions according to an embodiment of this disclosure.

FIG. 10 illustrates an example process 1000 for overall CG prioritization rule for UCI transmissions according to an embodiment of this disclosure. The processes depicted here could be used by any suitable devices, such as the eNBs and UEs in FIG. 6.

In an embodiment, In an embodiment, consider a UE in FIG. 6 operating in one of the configurations in FIG. 7. In operations 1002 and 1004, the UE is scheduled to transmit a set of UCI (e.g., HARQ-ACK, CSI, SR, or the like) to each of the CGs 1 and 2 in subframe n. Additionally, no PUxCHs have been scheduled for the UE to be transmitted in subframe n. In an embodiment, for each CG, a subset of UCI is selected from the set of UCI intended for the CG, and a PUxCH format to carry the subset of UCI is determined, according to Rel-11 CA procedure. PUxCH may be either a PUSCH or a PUCCH.

Furthermore, the UE operation of transmitting PUxCH in the subframe depends upon whether the UE is power-limited in the current subframe or not. The UE is said power-limited if total power, i.e., the sum of the individually calculated two PUxCHs' powers is greater than the UE's power class, or dB (or in linear scale). In operation 1006, if the UE is not power limited, then at operation 1008, the two PUxCHs are simultaneously transmitted on their respective CGs. In operation 1006, if the UE is power limited, then at operation 1010, the UE transmits only one of the two PUxCHs, where in operation 1010, the one selected PUxCH is determined according to a prioritization rule. In one or more embodiments, the term "selected" may be a prioritization of one PUxCH over another. For example, power may be allocated to a selected PUxCH with remaining power allocated to any other PUxCHs.

In operation 1014, a determination is made to whether there are any other PUSCHs scheduled. If there are not any other PUSCHs scheduled, then in operation 1016, the UE transmits the n PUxCHs. If there are other PUSCHs, then in operation 1018, the UE determines if the UE is power-limited when trying to transmit the PUSCHs as well as the PUxCHs carrying UCI. If not, then in operation 1020, the UE assigns full power to the PUSCHs as well as PUxCHs carrying UCI, and transmits all the physical UL signals. If yes in operation 1018, then the UE applies power scaling for the PUSCHs, and transmits all the physical UL signals.

In an embodiment, a UE is configured with Nconf CGs. In one subframe, the UE is scheduled to transmit CSI in N CGs, where N≤Nconf. Relying on the Rel-11 procedure for each CG, the UE figures out that CSI for N1 CGs are supposed to be carried on PUCCH and the UE figures out that CSI for N2 CGs are supposed to be carried on PUSCH, where N=N1+N2. Then, the UE applies CG prioritization for UCI transmissions, as in the following.

When not power limited, all the scheduled UL physical channels are transmitted in the subframe.

The UE is said power-limited in subframe i if total power, i.e., the sum of the individually calculated scheduled PUxCHs' powers in subframe i is greater than the UE's power class, or $P_{CMAX}(i)$ dB (or $\hat{P}_{CMAX}(i)$ in linear scale).

When power limited, the UCI transmitted in a CG in a lower CG index is prioritized. Among all the N PUxCH carrying UCI (i.e., PUxCH can be either PUCCH or PUSCH), the UE first tries to assign full power to the one PUxCH carrying UCI scheduled in the lowest CG index. For PUxCH carrying UCI scheduled in the CG with the second lowest CG index, the power allocation method is to choose a minimum value between the scheduled power value for the PUxCH according to the power control equation, and the remaining power. The power allocation continues in the same way until either all the PUxCHs carrying UCI are allocated with some powers, or there is no remaining power.

This procedure can be represented by the following equation.

$$\hat{P}_{PUxCH,n_{k+1}}(i) = \min\left(\hat{P}_{PUxCH,n_{k+1}}(i), \left(\hat{P}_{CMAX}(i) - \sum_{l=1}^{k}\hat{P}_{PUxCH,n_l}(i)\right)\right)$$

Here, $n_k$ is the CG index for which the k-th prioritized PUxCH is scheduled.

In one alternative, $n_k$ is the k-th smallest CG-prioritization-index among the N CG indices.

In another alternative, the k-th prioritized PUxCH is determined by the UCI contents, according to the previous methods disclosed in this application. In one alternative, tie breaks according to the CG-prioritization-index, where a lower CG index prioritized. In another alternative, tie breaks according to one of the HARQ-ACK CG-prioritization-index and periodic CSI CG-prioritization-index, depending on the type of tie. For example, if the tie happens such that both tie CGs carry the periodic CSI (or HARQ-ACK), then between the two tie CGs, the CG with smallest periodic CSI (or HARQ-ACK) CG-prioritization-index is prioritized.

For preventing near-far effects from happening for PUCCH transmissions, we may further impose a constraint.

In one alternative, the constraint is such that any PUCCH that cannot be transmitted with full power is dropped. In other words, if $\hat{P}_{PUCCH,n_{k+1}}(i)$ calculated from the above equation is less than the originally calculated power (i.e., $\hat{P}_{PUCCH,n_{k+1}}(i)$ on the right hand side equation), the PUCCH is dropped and zero power is assigned to the PUCCH.

In another alternative, the constraint is such that only one PUCCH (the most prioritized PUCCH) is transmitted in any given subframe. All the other scheduled PUCCHs will be assigned with zero power. This method is motivated for ensuring a simple specification.

If there is any remaining power after allocating power to the N PUxCHs, equal power scaling is applied to allocate power to PUSCHs without UCI.

This procedure can be represented by the following equation.

$$\sum_{c\notin J} w(i)\cdot \hat{P}_{PUSCH,c}(i) \le \left(\hat{P}_{CMAX}(i) - \sum_{l=1}^{N}\hat{P}_{PUSCH,n_l}(i)\right).$$

Figure 11:
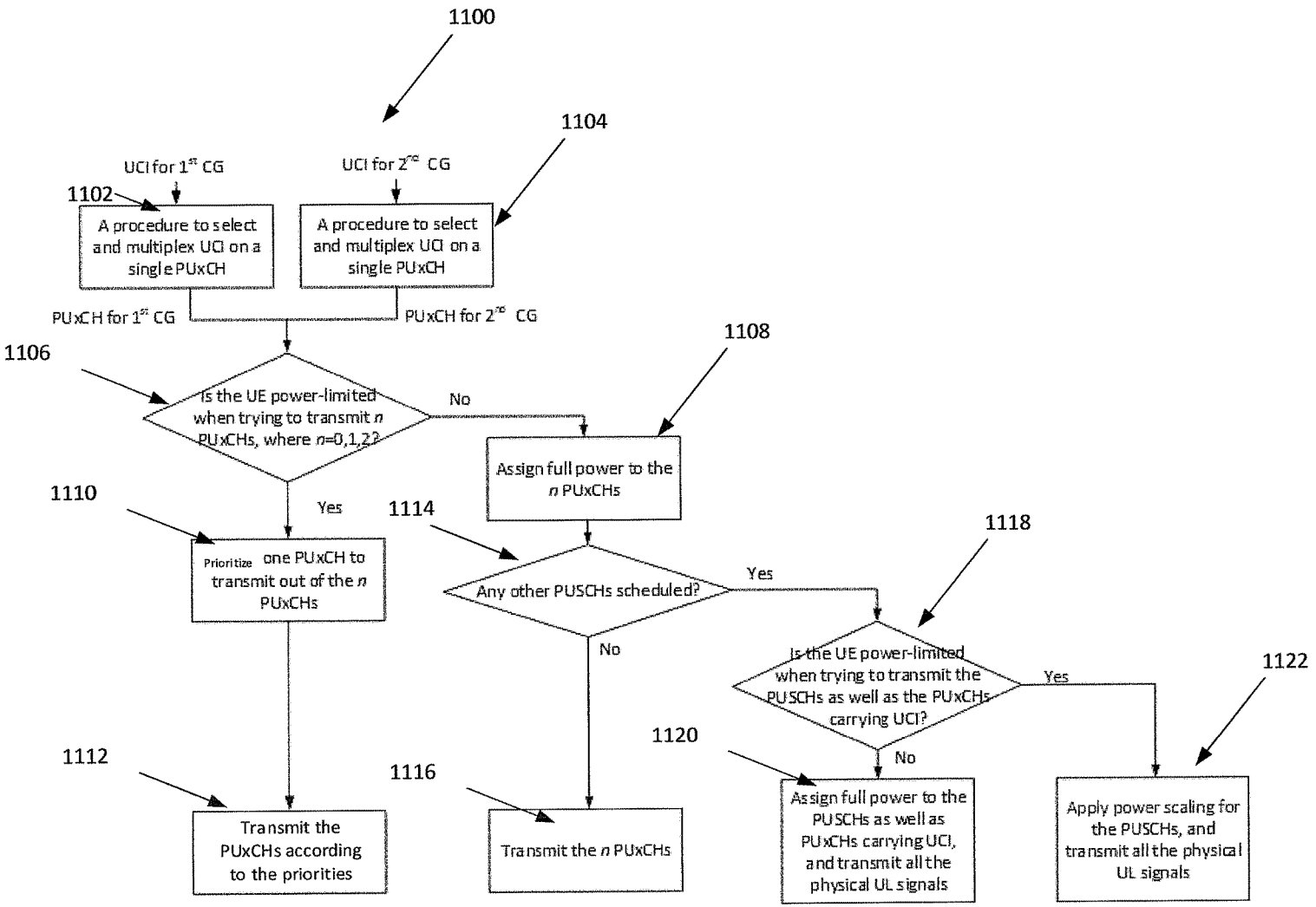
FIG. 11 illustrates an example process for overall CG prioritization rule for UCI transmissions according to an embodiment of this disclosure.

FIG. 11 illustrates an example process 1100 for overall CG prioritization rule for UCI transmissions according to an embodiment of this disclosure. The processes depicted here could be used by any suitable devices, such as the eNBs and UEs in FIG. 6.

Process 1100 is similar to process 1000, except in operation 1110, the UE prioritizes one PUxCH instead of selects.

In an embodiment, there may be a prioritization rule based on duplexing scheme/frame structure type. A UE can be configured with multiple cells that include one or more FDD cells and one or more TDD cells. A different duplexing method (FDD or TDD) among cells configured to a UE can result in different characteristics for respective UL transmissions. For a power limited UE, this motivates a dependence of an UL power allocation method or of a transmission prioritization rule on characteristics of respective UL transmissions. When the multiple cells are not-collocated, the UL transmissions should be targeted to their respective carrier groups. For example, UCI and UL data for a cell in a carrier group should be conveyed in UL resource belonging to the carrier group.

Figures 12A, 12B:
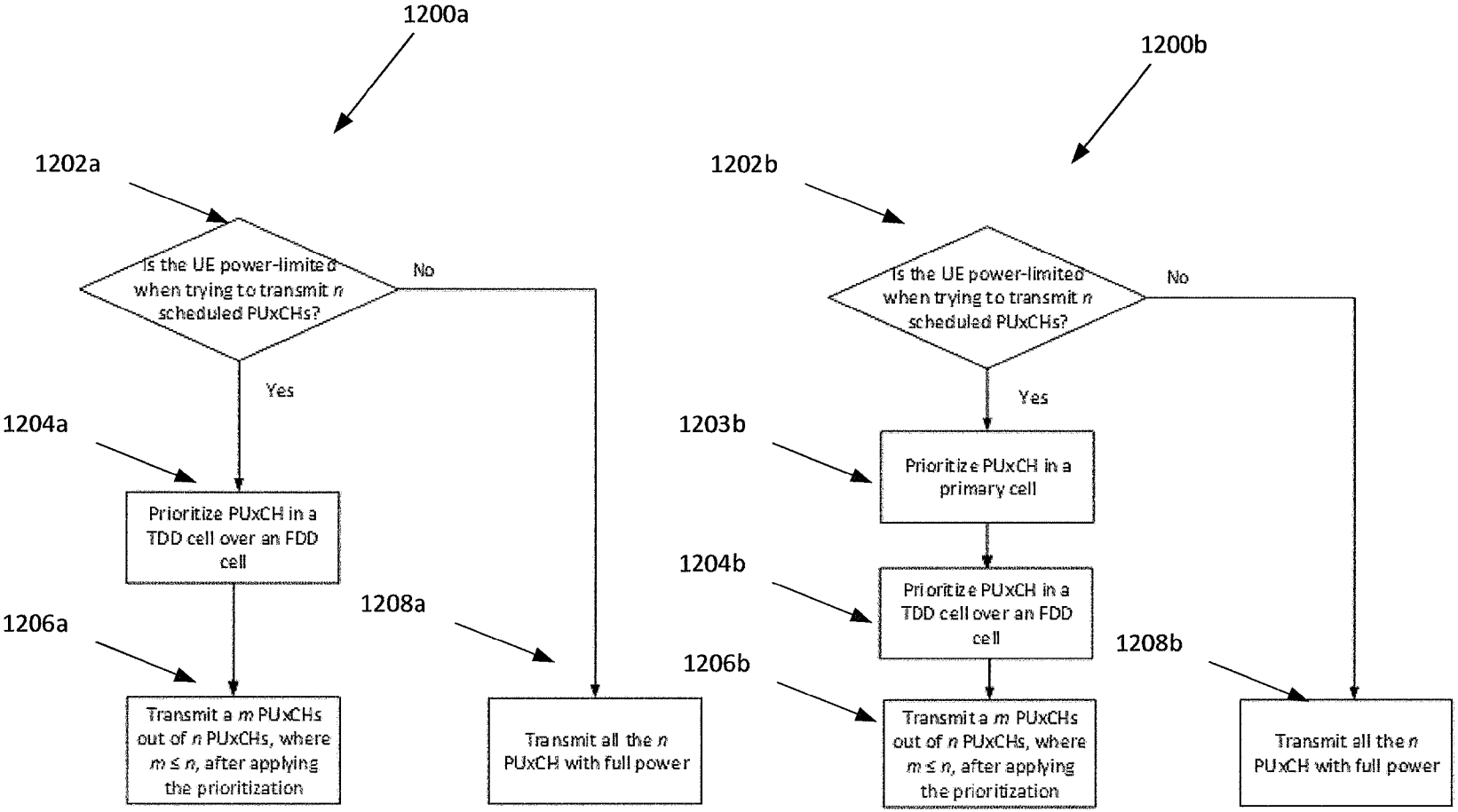
FIGS. 12A-12B illustrate example processes for rule based prioritization on duplexing scheme/frame structure type according to an embodiment of this disclosure.

FIGS. 12A-12B illustrate example processes 1202 for rule based prioritization on duplexing scheme/frame structure type according to an embodiment of this disclosure. The processes depicted here could be used by any suitable devices, such as the eNBs and UEs in FIG. 6.

In process 1200, at operation 1202, the UE determines if it is power-limited when trying to transmit n scheduled PUxCHs. If the UE is not power-limited, at operation 1208, the UE transmits all the n PUxCHs with full power. If the UE is power-limited, then in process 1200a, the UE, at operation 1204, prioritizes the PUxCH in a TDD cell over an FDD cell. Then, in operation 1206, the UE transmits a m PUxCHs out of n PUxCHs, where m≤n, after applying the prioritization.

In process 1200b, between operation 1202 and operation 1204, if the UE is power limited, the UE, at operation 1203b, prioritizes PUxCH in a primary cell.

In different embodiments, there may be different approaches to power allocation in the UL.

Approach 1: UL power allocation to a TDD cell is prioritized over a FDD cell. This is motivated by the fact that there fewer subframes in a TDD cell than in a FDD cell for transmitting UCI or UL data and a UCI payload, such as a HARQ-ACK payload, is often larger in a TDD cell than in a FDD cell (for example, for TDD UL/DL configurations 1/2/3/4/5). Therefore, an impact from an incorrect reception of UCI or UL data in a TDD cell can be higher than in a FDD cell and UL power allocation to the TDD cell can be prioritized.

Approach 2: UL power allocation in the primary cell in the primary carrier group is prioritized (regardless of the frame structure type of the cell). Approach 1 can then applied to the rest of the cells, i.e. TDD cell(s) is(are) prioritized over FDD cell(s). This can be beneficial because the primary carrier group may deliver important messages for the UE (control or configuration messages) and therefore the reception reliability for UCI or UL data to the primary cell should be prioritized.

Approach 2a: The primary cell is prioritized for UL power allocation. Approach 1 can then be applied to the rest of the cells. This approach can be applied, e.g., when a UE is configured with N cells located in N different sites (in other words, the N cells may belong to N different CGs).

Embodiment: Prioritization Rule Based on HARQ-ACK Payload Size

In TDD, an HARQ-ACK feedback can be in response to multiple PDSCHs in a bundling window, comprising multiple consecutive downlink subframes. This implies that an HARQ-ACK feedback associated with a larger bundling window size may contain more information. Based on this observation, approach 3 and approach 4 are proposed, as prioritization rules for embodiments corresponding to the FIGURES as disclosed herein.

Approach 3: UL power allocation is prioritized for a cell with a larger maximum bundling window size. If a maximum bundling window size is a same for two cells, a conventional prioritization or a prioritization as described in previous embodiments can apply. For TDD, the maximum bundling window size is determined by the size of the downlink association set, M. Table 2 shows the downlink association set for different TDD UL-DL configurations [3]. Table 3 shows the maximum M for each TDD UL-DL configuration, for FDD, and their corresponding priority according to Approach 3. For example, the maximum bundling window size for a TDD cell with UL-DL configurations 1/2/3/4/5 is larger than that of a FDD cell and of a TDD cell with UL-DL configuration 0/6. Hence, a TDD cell with UL-DL configuration 1/2/3/4/5 has higher priority over a FDD cell or a TDD cell with UL-DL configuration 0/6. It is noted that for Approach 3, a priority for UL power allocation for a TDD cell over a FDD cell is effectively TDD UL-DL configuration dependent as the FDD cell can have higher priority than a TDD cell with UL-DL configuration 0/6. Approach 3 can also be used to determine a priority for UL power allocation between two TDD cells with different UL-DL configurations.

TABLE 2

| | Downlink association set index: | | | | | | | | | |
|---|---|---|---|---|---|---|---|---|---|---|
| TDD UL-DL | Subframe n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 3

| Prioritization according to maximum bundling window size | | | | | | | | | | |
|---|---|---|---|---|---|---|---|---|---|---|
| TDD UL-DL | Subframe n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Approach 4: UL power allocation is prioritized for a cell with a larger bundling window size in a given subframe. For example, for TDD UL-DL configuration 1, HARQ-ACK transmission in subframe 2 or 7 can have higher priority in a TDD cell than in a FDD cell since they can have a larger bundling window size.

Approach 4A: UL power allocation for HARQ-ACK signal transmissions is prioritized according to the actual HARQ-ACK information payload transmitted by a UE. The UE, knowing an actual number of HARQ-ACK information bits it transmits in a respective PUCCH, including HARQ-ACK information bits for which the UE did not detect a PDCCH as they can be determined by a value of a DAI field in a PDCCH the UE detects in a subsequent subframe [3], can prioritize power for the PUCCH that includes a larger number of actual HARQ-ACK information bits in a given subframe. For example, for a same number of HARQ-ACK information bits per DL subframe, if in a first cell a UE is configured with TDD UL-DL configuration 2 and in a second cell the UE is configured with TDD UL-DL configuration 3, the UE can prioritize power allocation for PUCCH transmissions in UL subframe 2 to the second cell if it includes respective HARQ-ACK information for all subframes in Table 2 (subframes 7, 6, 11) while for the first cell it includes respective HARQ-ACK information for only two subframes (such as subframes 8, 7).

Approach 5: A network can configure to a UE the UL power allocation approach (e.g. Approach 1-4), for example via RRC.

Embodiment: Overall Prioritization Rule for FDD/TDD CA

A prioritization rule can also be based on combination of frame structure type and the physical channel type, or combination of frame structure type and the payload type. Some examples are provided below:

Approach 6: For prioritizing UL power allocation, PUCCH on TDD cell>PUCCH on FDD cell>PUSCH on TDD cell>PUSCH on FDD cell (where A>B indicates A has higher priority over B). This approach gives priority for UL power allocation first to PUCCH over PUSCH and second to TDD over FDD in order to ensure the reception reliability for PUCCH regardless of the frame structure type.

Approach 7: For prioritizing UL power allocation, PUCCH on TDD cell>PUCCH on FDD cell>PUSCH with UCI on TDD cell>PUSCH with UCI on FDD cell>PUSCH without UCI on TDD cell>PUSCH without UCI on FDD cell. This approach is similar to Approach 6 except that PUSCH with UCI is prioritized over PUSCH without UCI.

Approach 8: For prioritizing UL power allocation, UCI subframe on TDD cell>UCI subframe on FDD cell>non-UCI subframe on TDD cell>non-UCI subframe on FDD cell. This approach gives priority first to UL transmission with UCI over UL transmission without UCI, and second to TDD over FDD in order to ensure protection to UCI transmission regardless of the frame structure type.

Approach 9: For prioritizing UL power allocation, HARQ-ACK transmission on TDD cell>HARQ-ACK transmission on FDD cell>PUCCH on TDD cell>PUCCH on FDD cell>PUSCH on TDD cell>PUSCH on FDD cell. This approach specifically prioritizes HARQ-ACK over other UCI types.

Approach 10: For prioritizing UL power allocation, HARQ-ACK transmission on TDD cell>HARQ-ACK transmission on FDD cell>PUCCH on TDD cell>PUCCH on FDD cell>PUSCH with UCI on TDD cell>PUSCH with UCI on FDD cell>PUSCH without UCI on TDD cell>PUSCH without UCI on FDD cell. This approach is similar to Approach 9 except that that PUSCH with UCI is prioritized over PUSCH without UCI.

In all approaches above, when two cells are considered to have equal priority based on the above rules, rules disclosed in previous embodiments can serve for UL power allocation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) in a wireless communication network, the UE comprising:

a transceiver configured to transmit and receive signals; and processing circuitry coupled to the transceiver and configured[to], when the UE is configured to communicate with a plurality of carrier aggregation (CA) groups with at least a first CA group (CG1) and a second CA group (CG2), based on an information to be communicated, *to:* prioritize and allocate a transmission power between a master CA Group (MCG) and a secondary CA Group (SCG), apply a priority tie-breaking to the prioritization and allocation[;], and transmit, via the transceiver, a first uplink control information (UCI) to a cell belonging to the CG1 and a second UCI to a cell belonging to CG2, wherein:

when the first UCI and the second UCI comprise identical UCI types and when the CG1 is the MCG and the CG2 is the SCG, the processing circuitry is configured to apply a first power control formula for a physical uplink shared channel (PUSCH) on the cell belonging to the CG1 and a second power control formula for the PUSCH on the cell belonging to the CG2[;], and the PUSCH on the cell belonging to the CG1 is prioritized over the PUSCH on the cell belonging to the CG2, wherein each power control formula specifies a respective allocation of power for transmission to a respective cell.

2. The UE of claim 1, wherein, when the first UCI comprises a hybrid automatic-repeat-request acknowledgement (HARQ-ACK) and the second UCI does not include a HARQ-ACK, the processing circuitry is configured to apply a first power control formula for a HARQ-ACK transmission to the cell belonging to the CG1, and a second power control formula for a non-HARQ-ACK transmission cell belonging to the CG2, wherein the HARQ-ACK to the cell belonging to the CG1 is prioritized over a channel state information (CSI) to the cell belonging to the CG2, *and* wherein each power control formula specifies a respective allocation of power for transmission to a respective cell.

3. The UE of claim 1, wherein the processing circuitry is further [comprised] *configured* to:

assign full power to a transmission to a cell in the MCG; and assign zero power to a transmission to a cell in the SCG.

4. For use in a wireless communication network, an apparatus comprising:

a user equipment (UE) configured to communicate with a plurality of carrier aggregation (CA) groups with at least a first CA group (CG1) and a second CA group (CG2)[;], the UE comprising processing circuitry configured[to:], based on an information to be communicated, *to:* prioritize and allocate a transmission power between a master CA Group (MCG) and a secondary CA Group (SCG), and transmit a first uplink control information (UCI) on a physical uplink shared channel (PUSCH) to a cell belonging to the CG1 and a second UCI on the PUSCH to a cell belonging to the CG2, wherein, when the first UCI comprises a hybrid automatic-repeat-request acknowledgement (HARQ-ACK) and the second UCI does not include a HARQ-ACK and when the CG1 is the MCG and the CG2 is the SCG, the processing circuitry is configured to apply a first power control formula for a HARQ-ACK transmission to the cell belonging to the CG1, and a second power control formula for a non-HARQ-ACK transmission cell belonging to the CG2, wherein the HARQ-ACK to the cell belonging to the CG1 is prioritized over a channel state information (CSI) to the cell belonging to the CG2, *and* wherein each power control formula specifies a respective allocation of power for transmission to a respective cell.

5. The apparatus of claim 4, wherein the processing circuitry is further configured to:

assign full power to a prioritized transmission to a cell in the MCG; and assign remaining power to a non-prioritized transmission to a cell in the SCG.

6. The UE of claim 4, wherein the processing circuitry is further configured to:

assign full power to a prioritized transmission to a cell in the MCG; and assign zero power to a non-prioritized transmission to a cell in the SCG.

7. A system comprising:

a user equipment (UE) configured to communicate with a plurality of carrier aggregation (CA) groups with at least a first CA group (CG1) and a second CA group (CG2)[;], the UE comprising processing circuitry configured[to:], based on an information to be communicated, *to:* prioritize and allocate a transmission power between a master CA Group (MCG) and a secondary CA Group (SCG), apply a priority tie-breaking to the prioritization and allocation[;], and transmit first uplink control information (UCI) to a cell belonging to the CG1 and transmit second UCI to a cell belonging to the CG2, wherein, when the first UCI and the second UCI comprise identical UCI types and when the CG1 is the MCG and the CG2 is the SCG, the processing circuitry is configured to apply a first power control formula for a physical uplink shared channel (PUSCH) on the cell belonging to the CG1, and a second power control formula for the PUSCH on the cell belonging to the CG2, wherein the PUSCH on the cell belonging to the CG1 is prioritized over the PUSCH on the cell belonging to the CG2, *and* wherein each power control formula specifies a respective allocation of power for transmission to a respective cell.

8. The system of claim 7, wherein:

when the first UCI comprises a HARQ-ACK and the second UCI does not include HARQ-ACK, the processing circuitry is configured to apply a first power control formula for a HARQ-ACK communication to the cell belonging to the CG1 and a second power control formula for a non-HARQ-ACK communication to the cell belonging to the CG2; and the HARQ-ACK communication to the cell belonging to the CG1 is prioritized over the non-HARQ-ACK communication to the cell belonging to the CG2 wherein each power control formula specifies a respective allocation of power for transmission to a respective cell.

9. A method for prioritizing transmissions and power allocations in a user equipment (UE) configured to communicate with a plurality of carrier aggregation (CA) groups with at least a first CA group (CG1) and a second CA group (CG2), *the method* comprising:

prioritizing, according to an information type to be communicated, and allocating a transmission power between a master CA Group (MCG) and a secondary CA Group (SCG)[,];

applying a priority tie-breaking to the prioritization and allocation[,];

transmitting a first uplink control information (UCI) to a cell belonging to the CG1 and a second UCI to a cell belonging to the CG2[,]; and when the first UCI and the second UCI comprise identical UCI types and when the CG1 is the MCG and the CG2 is the SCG, applying a first power control formula for a physical uplink shared channel (PUSCH) transmission to the cell belonging to the CG1, and a second power control formula for the PUSCH transmission to the cell belonging to the CG2, wherein the transmission to the cell belonging to the CG1 is prioritized over the transmission to the cell belonging to the CG2, *and* wherein each power control formula specifies a respective allocation of power for transmission to a respective cell.

10. The method of claim 9, wherein, when the first UCI comprises a HARQ-ACK and the second UCI does not include HARQ-ACK, *the method* further [comprising] *comprises* applying a first power control formula for a HARQ-ACK communication to the cell belonging to the CG1, and a second power control formula for a non-HARQ-ACK communication to the cell belonging to the CG2, wherein the HARQ-ACK communication to the cell belonging to the CG1 is prioritized over the non-HARQ-ACK communication to the cell belonging to the CG2, *and* wherein each power control formula specifies a respective allocation of power for transmission to a respective cell.

11. The method of claim 9, further comprising:

assigning full power to a transmission to a cell in the MCG; and assigning zero power to a transmission to a cell in the SCG.

12. A method for prioritizing transmissions and power allocations in a user equipment (UE) configured to communicate with a plurality of carrier aggregation (CA) groups with at least a first CA group (CG1) and a second CA group (CG2), *the method* comprising:

prioritizing, according to an information type to be communicated, and allocating a transmission power between a master CA Group (MCG) and a secondary CA Group (SCG)[,]*;* transmitting a first uplink control information (UCI) on a physical uplink shared channel (PUSCH) to a cell belonging to the CG1 and a second UCI on the PUSCH to a cell belonging to the CG2[,]*;* and when the first UCI comprises a hybrid automatic-repeat-request acknowledgement (HARQ-ACK) and the second UCI does not include a HARQ-ACK and when the CG1 is the MCG and the CG2 is the SCG, applying a first power control formula for a HARQ-ACK transmission to the cell belonging to the CG1, and a second power control formula for a non-HARQ-ACK transmission cell belonging to the CG2, wherein the HARQ-ACK to the cell belonging to the CG1 is prioritized over a channel state information (CSI) to the cell belonging to the CG2, *and* wherein each power control formula specifies a respective allocation of power for transmission to a respective cell.

13. The method of claim 12, further comprising:

assigning full power to a prioritized transmission to a cell in the MCG; and assigning remaining power to a non-prioritized one of the transmission to a cell in the SCG.

14. The method of claim 12, further comprising:

assigning full power to a prioritized transmission to a cell in the MCG; and assigning zero power to a non-prioritized transmission to a cell in the SCG.

15. A method for prioritizing a transmissions and power allocations in a user equipment (UE) configured to communicate with a plurality of carrier aggregation (CA) groups with at least a first CA group (CG1) and a second CA group (CG2), *the method* comprising:

prioritizing, according to an information type to be communicated, and allocating a transmission power between a master CA Group (MCG) and a secondary CA Group (SCG);

applying a priority tie-breaking to the prioritization and allocation;

transmitting a first uplink control information (UCI) in a physical uplink shared channel (PUSCH) to a cell belonging to the CG1 and a second UCI on the PUSCH to a cell belonging to the CG2;

transmitting a first hybrid automatic-repeat-request acknowledgement (HARQ-ACK) in a physical uplink shared channel (PUSCH) to a cell belonging to the CG1 and a second HARQ-ACK on a PUCCH to a cell belonging to CG2; and when the first UCI and the second UCI comprise identical UCI types and when the CG1 is MCG and the CG2 is the SCG, [the processing circuitry is configured to apply] *applying* a first power control formula for the physical uplink shared channel (PUSCH) on the cell belonging to the CG1 and a second power control formula for the PUSCH on the cell belonging to the CG2, wherein the PUSCH on the cell belonging to the CG1 is prioritized over the PUSCH on the cell belonging to the CG2, *and* wherein each power control formula specifies a respective allocation of power for transmission to a respective cell.

16. The method of claim 15, further comprising:

assigning full power to a prioritized a transmission to a cell in the MCG; and assigning remaining power to a non-prioritized a transmission to a cell in the SCG.

17. The method of claim 15, further comprising:

assigning full power to a prioritized a transmission to a cell in the MCG; and assigning zero power to a non-prioritized a transmission to a cell in the SCG.

*18. A user equipment (UE) in a wireless communication system, the UE comprising:*

*a transceiver configured to transmit or receive signals; and*

*a processor coupled with the transceiver and configured to allocate power to uplink channel transmissions according to a priority order when the UE operates with carrier aggregation (CA) and a total transmit power for the uplink channel transmissions would exceed a maximum transmission power that is a linear value,*

*wherein the priority order is defined such that:*

*an uplink channel transmission with a hybrid automatic repeat request acknowledgement (HARQ-ACK) is prioritized over an uplink channel transmission with channel state information (CSI), and*

*an uplink channel transmission with CSI is prioritized over an uplink channel transmission without HARQ-ACK or CSI, and*

*wherein an uplink channel transmission in a cell associated with a primary cell group (PCG) is prioritized over an uplink channel transmission in a cell associated with a secondary cell group (SCG) when the*

*uplink channel transmission in the cell associated with PCG and the uplink channel transmission in the cell associated with the SCG are of a same priority.*

*19. The UE of claim 18, wherein an uplink channel transmission of a primary serving cell (Pcell) is prioritized over an uplink channel transmission of a secondary serving cell (Scell) when the uplink channel transmission of the Pcell and the uplink channel transmission of the Scell are of a same priority.*

*20. The UE of claim 18, where a physical uplink control channel (PUCCH) transmission in a primary serving cell (Pcell) of a primary cell group (PCG) is prioritized over a PUCCH transmission in a primary serving cell (Pcell) of a secondary cell group (SCG) when the PUCCH transmission of the PCG and the PUCCH transmission of the SCG are of a same priority.*

*21. The UE of claim 18, where the priority order is defined regardless of whether an uplink channel transmission is a physical uplink control channel (PUCCH) or a physical uplink shared channel (PUSCH).*

*22. The UE of claim 18, wherein the priority order is further defined such that:*

*an uplink channel transmission with HARQ-ACK or a scheduling request (SR) is prioritized over an uplink channel transmission with uplink control information other than HARQ-ACK/SR.*

*23. The UE of claim 18, wherein the processor is further configured to allocate a transmission power to an uplink channel transmission with a higher priority order, and allocate a remaining power to a remaining uplink channel transmission.*

*24. A method of operating an user equipment (UE) in a wireless communication system, the method comprising:*

*allocating power to uplink channel transmissions according to a priority order when the UE operates with carrier aggregation (CA) and a total transmit power for the uplink channel transmissions would exceed a maximum transmission power that is a linear value; and*

*transmitting uplink signals of the uplink channel transmissions,*

*wherein the priority order is defined such that:*

*an uplink channel transmission with hybrid automatic repeat request acknowledgement (HARQ-ACK) is prioritized over an uplink channel transmission with channel state information (CSI), and*

*an uplink channel transmission with CSI is prioritized over an uplink channel transmission without HARQ-ACK or CSI, and*

*wherein an uplink channel transmission in a cell associated with a primary cell group (PCG) is prioritized over an uplink channel transmission in a cell associated with a secondary cell group (SCG) when the uplink channel transmission in the cell associated with PCG and the uplink channel transmission in the cell associated with the SCG are of a same priority.*

*25. The method of claim 24, wherein an uplink channel transmission of a primary serving cell (Pcell) is prioritized over an uplink channel transmission of a secondary serving cell (Scell) when the uplink channel transmission of the Pcell and the uplink channel transmission of the Scell are a same priority.*

*26. The method of claim 24, where a physical uplink control channel (PUCCH) transmission in a primary serving cell (Pcell) of a primary cell group (PCG) is prioritized over a PUCCH transmission in a primary serving cell (Pcell) of a secondary cell group (SCG) when the PUCCH transmission of the PCG and the PUCCH transmission of the SCG are of a same priority.*

*27. The method of claim 24, where the priority order is defined regardless of whether an uplink channel transmission is a physical uplink control channel (PUCCH) or a physical uplink shared channel (PUSCH).*

*28. The method of claim 24, wherein the priority order is further defined such that:*

*an uplink channel transmission with HARQ-ACK or a scheduling request (SR) is prioritized over an uplink channel transmission with uplink control information other than HARQ-ACK/SR.*

*29. The method of claim 24, wherein allocating the power to the uplink channel transmissions comprises:*

*allocating a transmission power to an uplink channel transmission with a higher priority order; and*

*allocating a remaining power to a remaining uplink channel transmission.*

* * * * *